US 6,690,296 B2
United States Patent
Corwin et al.

(10) Patent No.: US 6,690,296 B2
(45) Date of Patent: *Feb. 10, 2004

(54) AIRBORNE ALERTING SYSTEM

(75) Inventors: William R. Corwin, Maple Grove, MN (US); Christine M. Haissig, Chanhassen, MN (US); Michael Jackson, New Brighton, MN (US); Paul P. Samanant, Eden Prairie, MN (US); Scott I. Snyder, Mahtomedi, MN (US); Jarold Weiser, Glendale, AZ (US)

(73) Assignee: Honeywell Inc., Morristown, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 62 days.

(21) Appl. No.: 09/224,177

(22) Filed: Dec. 31, 1998

(65) Prior Publication Data

US 2003/0004641 A1 Jan. 2, 2003

(51) Int. Cl.[7] .................................................. G08G 5/04
(52) U.S. Cl. ..................... 340/961; 340/945; 340/963; 701/14; 701/301; 342/29
(58) Field of Search ........................ 340/961, 945, 340/947, 948, 951, 958, 973, 972, 974, 981, 982, 963; 701/301, 14; 342/29, 30, 31, 32, 36, 455, 456, 44

(56) References Cited

U.S. PATENT DOCUMENTS

| 4,454,510 | A |   | 6/1984 | Crow |
| 5,202,684 | A | * | 4/1993 | Funatsu ...................... 340/961 |
| 5,208,591 | A | * | 5/1993 | Ybarra et al. ............... 340/961 |
| 5,325,302 | A |   | 6/1994 | Izidon et al. ............... 364/461 |
| 5,381,140 | A | * | 1/1995 | Kuroda et al. .............. 340/961 |
| 5,475,393 | A | * | 12/1995 | Heinzerling ................ 342/410 |
| 5,493,309 | A |   | 2/1996 | Bjornholt .................... 342/455 |
| 5,566,074 | A | * | 10/1996 | Hammer ..................... 340/961 |
| 5,570,095 | A | * | 10/1996 | Drouilhet, Jr. et al. ..... 342/357 |
| 5,629,691 | A | * | 5/1997 | Jain ............................. 340/961 |
| 5,714,948 | A | * | 2/1998 | Farmakis et al. ........... 340/961 |
| 5,872,526 | A | * | 2/1999 | Tognazzini ................. 340/961 |
| 5,933,099 | A | * | 8/1999 | Mahon ....................... 340/961 |
| 6,020,831 | A | * | 2/2000 | Nishida et al. ............. 340/961 |

FOREIGN PATENT DOCUMENTS

| DE | 19602053 | 7/1997 | ............ G08G/9/02 |
| DE | 19757042 | 6/1999 | ............ G01S/1/16 |

OTHER PUBLICATIONS

"Closely Spaced Parallel Approaches", http://www.asc.nasa.gov/tap/cspa/cspa.html, (1998), pp. 1–4.
Carpenter, B., et al., "A Probability–Base Alerting Logic for Aircraft on Parallel Approach", *NASA Contractor Report 201685*, L44581D, (1997), pp. 1–106.
Koczo, S., "Coordinated Parallel Runway Approaches", *NASA Contractor Report 201611*, Contract NAS1–19704, (1996), pp. 1–1—C–38.

(List continued on next page.)

*Primary Examiner*—Nina Tong

(57) ABSTRACT

Systems, methods and protocol for assuring separation of aircraft during parallel approaches. The systems, methods and protocol function in cooperation with existing TCAS to facilitate approaches of multiple aircraft on closely-spaced parallel runways. The systems, methods and protocol utilize data transmissions from equipped aircraft to obtain tracking information which is used in separation algorithms to generate alerts to an observer of possible threats. The systems, methods and protocol facilitate parallel approaches to closely-spaced parallel runways under Instrument Approach Procedure.

12 Claims, 14 Drawing Sheets

OTHER PUBLICATIONS

Kuchar, J., "White Paper on Multiple Independent Alerting Systems", http://web.mit.edu/jkkuchar/www/white/whitepaper.html, Department of Aeronautics and Astronautics, Massachusetts Institute of Technology, Cambridge, MA, (1998),pp. 1–7.

Pritchett, A., et al., "Issues in Airborne Systems for Closely–Spaced Parallel Runway Operations", *AIAA/IEEE 14th Digital Avionics Systems Conference*, http://web.mit.edu.aeroastro/www/labs/ASL/PRO_DASC/pro_dase.html, Cambridge, MA, (1995), pp. 1–8.

Winder, L., et al., "Evaluation of Vertical Collision Avoidance Maneuvers for Parallel Approach", *AIAA Guidance, Navigation, and Control Conference*, http://www.mit.edu/~jkkuchar/AIAA–98–4242/AIAA–98–4242.html, Boston, MA, (1998), pp. 1–13.

Abstract of German Patent Application No. DE 19602053, filed Jul. 24, 1997, 2 pages. German patent submitted in Information Disclosure Statement Jul. 30, 2001.

Abstract of German Patent Application No. DE19757042, filed Jun. 24, 1999, 1 page. German patent submitted in Information Disclosure Jul. 30, 2001.

* cited by examiner

AIRBORNE ALERTING SYSTEM

TECHNICAL FIELD

The invention relates generally to airborne alerting systems, and more specifically to an airborne alerting system to provide separation assurance during closely-spaced parallel approaches.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. The following notice applies to the software and data as described below and in the drawings hereto: Copyright© 1998, Honeywell, Inc., All Rights Reserved.

BACKGROUND INFORMATION

Air travel is becoming increasingly prevalent in both business and leisure travel. As a result, airports are experiencing increasing amounts of air traffic. Accordingly, air traffic control needs to become more efficient to safely bring in more aircraft with limited resources, i.e., runways.

Currently, airports that have aircraft landing on runways that are less than 4,300 feet apart suffer a serious reduction in capacity when Instrument Approach Procedures (IAPs) are implemented due to weather conditions. The weather conditions under which IAPs commence are not as severe as Instrument Meteorological Conditions, defined by the U.S. Federal Aviation Administration (FAA) to be ceilings less than 1,000 feet or visibility less than 3 miles. For example, a midwestern airport adopts IAP when the ceiling is less than 3,200 feet or when visibility is less than 8 miles.

For a number of years, the quest for capacity improvements to make Airport Arrival Rates (AAR) robust to weather changes has been pursued with vigor. Recently, a system called the Precision Runway Monitor (PRM) has been developed by the FAA, which gives the controllers high-update surveillance capability and an alerting function to determine if aircraft are blundering and need to perform a "breakout" maneuver to avoid a potential collision. PRM applies to runways with spacings, centerline to centerline, of at least 3,400 feet.

But airports are not always afforded the luxury of runway spacings of at least 3,400 feet. Busier airports tend to be associated with large metropolitan areas where real estate is at a premium. Runway spacing may be as low as 2,500 feet or even lower in many airports.

As will be seen from the above concerns, there exists a need for an airborne alerting system to provide capacity improvements, especially for the case of runway spacing below 3,400 feet. The above mentioned problems with AAR and other problems are addressed by the present invention and will be understood by reading and studying the following specification.

SUMMARY OF THE INVENTION

The invention provides a method of assuring separation of aircraft during approach. In one embodiment, tracking information for aircraft is obtained through data transmissions by the aircraft. An observer is alerted if the tracking information indicates at least one of the aircraft is blundering from an assigned approach.

Another embodiment of the invention provides a method of assuring separation of aircraft between a first aircraft and other aircraft. The method includes determining whether the other aircraft are transmitting tracking information. Aircraft transmitting the tracking information are armed aircraft. The tracking information comprises position and velocity, wherein the position is defined in a geographic coordinate system. The method further includes obtaining the tracking information from each armed aircraft, applying separation assurance algorithms to the tracking information for each armed aircraft within a predetermined zone relative to the first aircraft, and alerting an observer when the separation assurance algorithms are indicative of a threat to the first aircraft.

A further embodiment of the invention includes an alerting system. The alerting system includes a track file. The track file contains data including latitude data, longitude data and altitude data for each aircraft providing ADS-B position reports to support the alerting function associated with closely-spaced parallel approaches. The data are defined in a geographic coordinate system. The alerting system generates alerts to an observer when a comparison of the positions and trajectories are indicative of a threat to the observer.

The various embodiments of the invention may be implemented on computer systems and provide an improvement over the Precision Runway Monitor system because the embodiments of the invention are applicable to runways spaced as closely as 2,500 feet. While the concepts of the invention are applicable to runways spaced closer than 2,500 feet, current FAA rules associated with Wake Vortex protection require that two runways be treated as a single runway if they are closer than 2,500 feet. The airborne alerting system further provides pilots proximity awareness of the adjacent traffic. The airborne alerting system allows for minimal ground infrastructure, reducing installation and operational costs. It further reduces air traffic controller personnel requirements, since PRM requires two dedicated controllers and the system embodied in the invention does not. By leveraging existing TCAS II protocols, pilot training is minimized. And the airborne alerting system embodied by the invention also facilitates quicker alerting of pilots to potential problems, given that alerting comes directly from an on-board system and not via an air traffic controller over the radio. Subsequently, safety is increased and/or false alarms are reduced.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense, and the scope of the invention is defined by the appended claims. Like numbers in the figures refer to like components, which should be apparent from the context of use.

In the following description, the terms own ship (or aircraft), other ship (or aircraft) and adjacent ship (or aircraft) will be used. Own ship refers to the aircraft from which a frame of reference is established, e.g., a pilot's own aircraft. Other ship refers to any aircraft other than own ship. Adjacent ship refers to another aircraft in a parallel approach with own ship. An adjacent ship, by definition, is also an other ship.

The invention includes an airborne alerting system to provide separation assurance during closely-spaced parallel approaches. Closely-space parallel approaches are defined as approaches to parallel runways separated by less than 4,300 between runway centerlines. The concepts embodied by the invention are referred to herein by the modified acronym CASPER for Closely-Spaced Parallel Runways.

Figure 1:
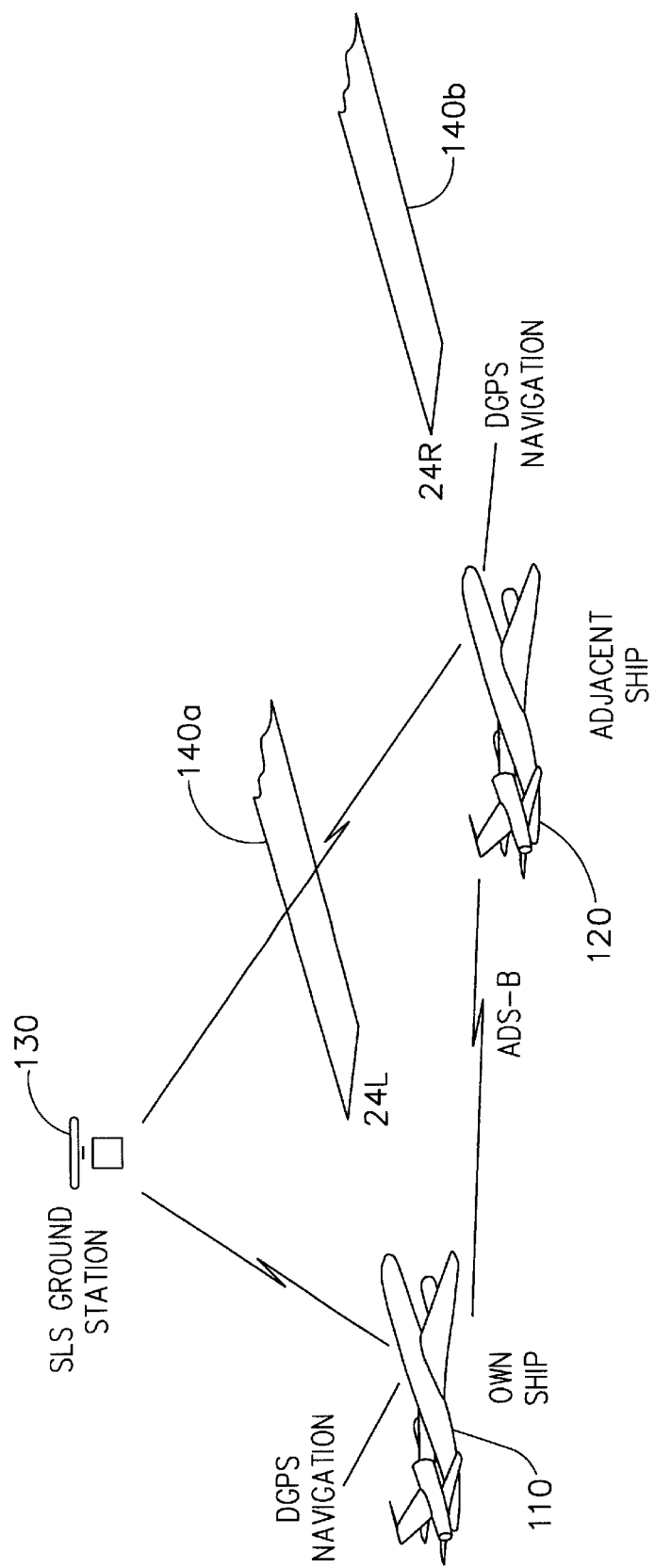
FIG. 1 is an elevation of aircraft in parallel approach in accordance with one embodiment of the invention.

One embodiment of the invention is illustrated in FIG. 1. FIG. 1 depicts own ship 110 approaching first runway 140a and adjacent ship 120 approaching second runway 140b. First runway 140a and second runway 140b are a pair of parallel runways. Each aircraft, or ship 110 and 120, uses Differential Global Positioning System (DGPS) navigation to fly a precision approach. The precision approach is uplinked to each aircraft from a Satellite Landing System (SLS) ground station 130. The SLS ground station 130 also provides the differential corrections to the on-board GPS (not shown) to enable DGPS navigation. Each aircraft broadcasts its position, velocity, and intended glidepath using Automatic Dependent Surveillance-Broadcast (ADS-B). The CASPER system uses the received ADS-B information from the other aircraft in combination with its own aircraft state-data to determine if either aircraft is flying a threatening trajectory (i.e., blundering off its approach course) with respect to the other. An aircraft flying such a threatening trajectory will be referred to herein as a threat to the other aircraft.

In one embodiment, the invention includes criteria for determining which aircraft are landing on a parallel runway and could be threats, auditory and visual status annunciations, a methodology for interacting with the Traffic Alert and Collision Avoidance System (TCAS) and communication of alerting system status to the ground to keep Air Traffic Control informed.

In another embodiment, the invention further includes precise navigation along the approach path, enabled by the Differential Global Positioning System ground station. The embodiment further includes a sharing of position, direction of flight, alerting system status and TCAS system status, and approach information via the Automatic Dependent Surveillance-Broadcast (ADS-B) link between the aircraft. The embodiment still further includes an alerting function that checks the velocity and direction of flight for the various aircraft, checks the trajectory to determine if it is hazardous to surrounding aircraft, and provides visual and auditory alerts to an observer, e.g., a pilot, if a hazardous situation is developing. In addition, the embodiment includes a concept of operations which provides linkage between the constituent parts and a sequence to the events, including system modes.

Figure 2:
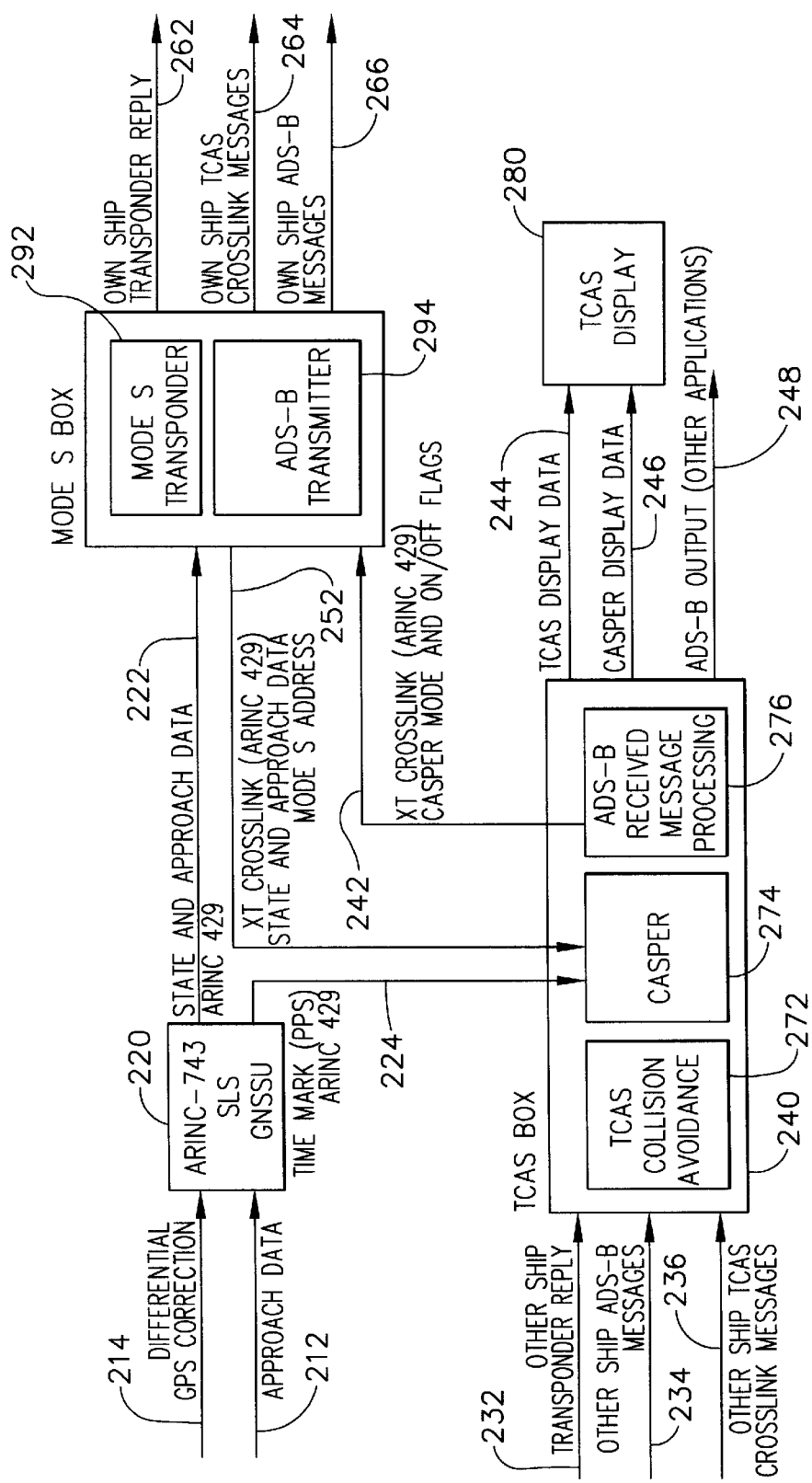
FIG. 2 is a block diagram of an airborne alerting system in accordance with one embodiment of the invention.

FIG. 2 is a block diagram illustrating the various functions of an embodiment of the invention, identified in the previous paragraph, and indicates what hardware may be used to host the functions as well as the nature of the links and information flow between the various hardware elements. Approach data 212 and differential GPS Correction 214 are provided as inputs to sensor 220. Sensor 220 is represented as an ARINC-743 SLS GNSSU (Global Navigation System Sensor Unit). ARINC-743 Airborne Global Positioning System Receiver defines the air transport industry's standards for the development of GPS sensors for airline use. Sensor 220 provides outputs across an ARINC-429 bus. These outputs include state and approach data 222 and time mark (Pulse Per Second; PPS) 224. ARINC-429 Digital Information Transfer System (DITS) defines the air transport industry's standards for digital data transfer between avionics equipment elements. These standards apply to intra-system communications where system elements or equipment are defined in the various ARINC 700-series Characteristics.

TCAS box 240 includes a TCAS collision avoidance module 272, a CASPER module 274 and an ADS-B received message processing module 276. Other ship transponder reply 232, other ship ADS-B messages 234 and other ship TCAS crosslink messages 236 are provided as inputs to TCAS box 240. TCAS box 240 further accepts time mark 224 as an input, as well as XT crosslink 252. TCAS box 240 provides multiple outputs. These outputs include TX crosslink 242, TCAS display data 244, CASPER display data 246 and ADS-B output 248. TX crosslink 242 includes mode information and on/off flags as described later. ADS-B output 248 is provided to other applications.

Mode S box 260 includes a Mode S transponder 292 and an ADS-B transmitter 294. Mode S box 260 accepts inputs State and Approach Data 222 and TX Crosslink 242. Mode S box 260 provides outputs XT crosslink 252, own ship transponder reply 262, own ship TCAS crosslink messages 264 and own ship ADS-B messages 266.

TCAS display 280 accepts TCAS display data 244 and CASPER display data 246 for display of auditory and visual status annunciations.

Precise Navigation

The AILS (Airborne Information for Lateral Spacing) separation assurance algorithms use navigation data two ways. Aircraft position is used to evaluate how well the pilot is following the glidepath. Aircraft position and velocity are used to predict future position to determine whether aircraft on parallel approaches threaten one another. AILS is the NASA program for developing alerting algorithms for closely spaced parallel approaches. AILS also refers to the alerting logic used once the aircraft are established on a parallel approach.

The GNSSU contains a GPS receiver that provides navigation data. When the aircraft is within range of the SLS ground station, the GPS data is differentially corrected. The GNSSU outputs a variety of navigation-related parameters on an ARINC 429 bus. Most data is available at 1 Hz.

Aircraft position is described using GPS latitude, longitude, and altitude. GPS latitude and longitude use two labels each, i.e., octal labels 110/120 and 111/121 respectively. Aircraft velocity is described as North/South velocity, East/West velocity, and vertical velocity using octal labels 166, 174, 165 respectively.

To evaluate the validity and accuracy of the navigation data, the airborne alerting system algorithms make use of the horizontal and vertical figures of merit (HFOM and VFOM). HFOM and VFOM use octal labels 136 and 247 respectively. These provide an estimate of the accuracy of the position data output by the GNSSU. The FOM is the 95% confidence level (2σ) for the accuracy of the position solution. For example, if the HFOM were 0.7 nm (nautical miles), we would expect that 95% of the time the aircraft horizontal position that is output by the GNSSU is within 0.7 nm of the true position. When the GNSSU is in differential mode, VFOM is typically 2–3 m, while HFOM is typically 1–2 m. When the GNSSU is in navigation mode, VFOM is typically 80–100 m, while HFOM is typically 50–80 m.

To assure that the navigation data between the own ship and other ship can be synchronized, the alerting system utilizes UTC (Universal Coordinated Time) time from the GNSSU. UTC time is divided into two ARINC labels and is available in a variety of ways. Use of octal labels 150 and 140 allows obtaining UTC time to 1 msecond resolution. Although UTC time is currently available to 0.9 nanosecond resolution, such precision is expected to provide only marginal improvement in accuracy or safety.

To synchronize system time and UTC time, the time mark on the GNSSU is used. The time mark is a 1 Hz signal with its rising edge corresponding to the time when the navigation outputs on the ARINC 429 bus are valid. This synchronization is performed by a time manager function, described later, and is part of the functionality of CASPER module 274 hosted in the TCAS hardware, i.e., TCAS box 240.

The differential corrections to the GPS signal come from the VHF Data Link Unit (VDLU) (not shown). The VDLU can experience dropouts, depending on the approach an aircraft is on and the distance from the VHF transmitting antenna. It is uncommon to experience an outage in the VDLU link once the aircraft is on course at the final approach fix at 4.5 nm. Outside of 6.5 nm from the runway threshold, the coast time for the SLS is 30 seconds. Inside of 6.5 nm, the coast time is 6 seconds. Once the coast time is exceeded, the GNSSU currently drops out of differential mode.

Figure 3:
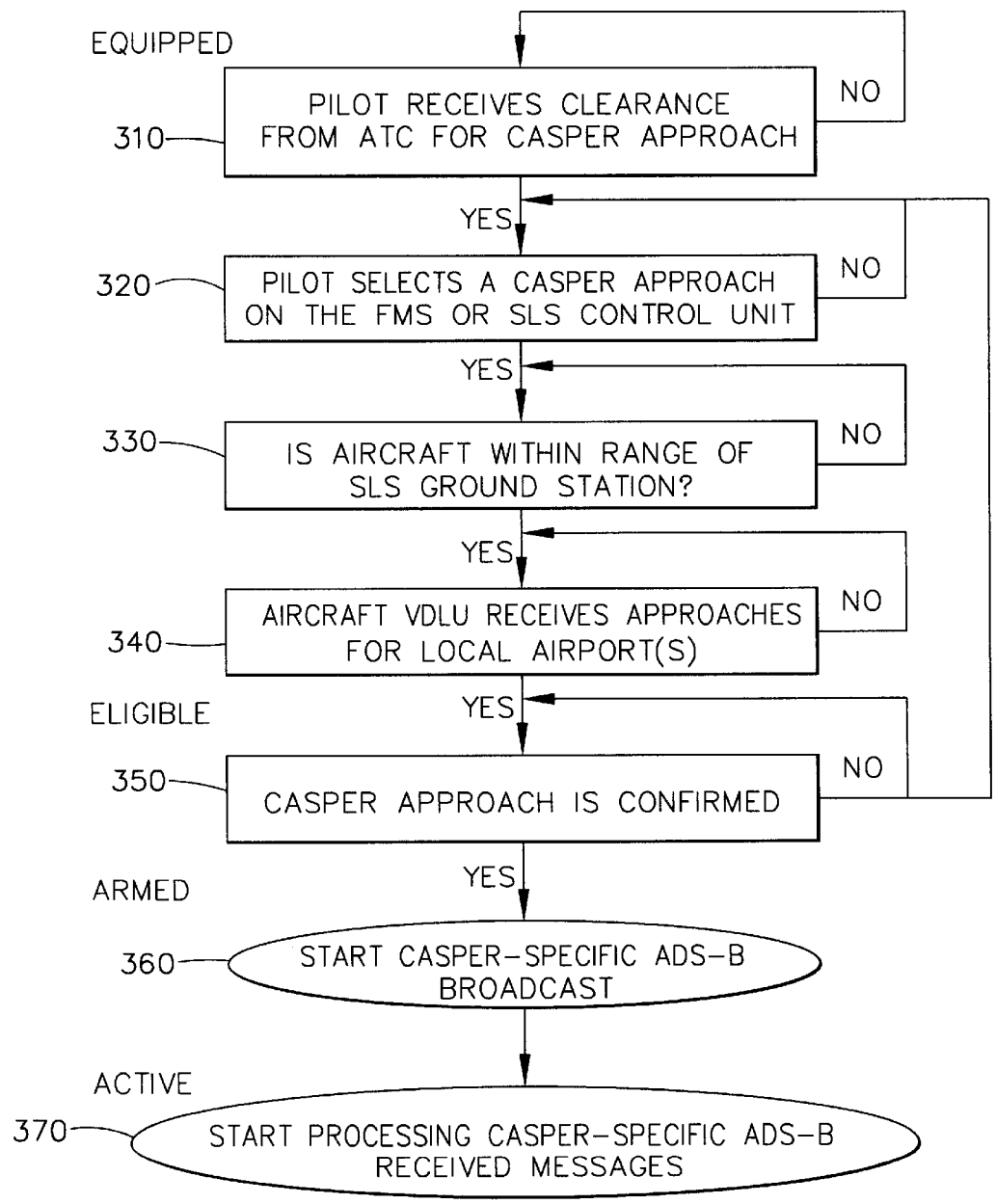
FIG. 3 is a flowchart of the sequence of events as an aircraft approaches a destination airport in accordance with one embodiment of the invention.

FIG. 3 is a sequence flowchart of events as an aircraft approaches a destination airport. Box 310 determines whether the aircraft pilot has received clearance from Air Traffic Control (ATC) for a CASPER approach. If clearance is not received, control is returned to box 310. If clearance is received, control is passed to box 320.

Box 320 determines whether the pilot has selected a CASPER approach on the Flight Management System (FMS) or SLS control unit. If the pilot has not selected a CASPER approach, control is returned to box 320. If the pilot has selected a CASPER approach, control is passed to box 330.

Box 330 determines whether the aircraft is within range of an SLS ground station. If the aircraft is not within range, control is returned to box 330. If the aircraft is within range, control is passed to box 340.

Box 340 determines whether the aircraft VDLU receives approaches for local airports. If the aircraft VDLU does not receive such approaches, control is returned to box 340. If the aircraft VDLU does receive such approaches, control is passed to box 350.

Box 350 determines whether a CASPER approach is confirmed. If a CASPER approach is not confirmed, control remains in box 350 awaiting approach confirmation, or control is passed to box 320 if a new CASPER approach is selected by the pilot. If the CASPER approach is confirmed, control is passed to box 360.

Box 360 initiates a CASPER-specific ADS-B broadcast and passes control to box 370. Box 370 initiates processing of CASPER-specific ADS-B messages received from other aircraft. The CASPER modes corresponding to FIG. 3 are given in Table 1.

TABLE 1

CASPER Operational Modes

| Mode | Equipped | Eligible | Armed | Active |
|---|---|---|---|---|
| Description | Indicates if an aircraft has the equipment necessary to perform CASPER approaches. Used by ATC to determine if an aircraft can be assigned a CASPER approach. | Indicates that an aircraft has successfully dialed in a CASPER approach and received that approach from the ground station. Used by ATC to flag a problem if | Indicates that an aircraft is broadcasting and receiving CASPER-specific ADS-B messages and all systems are go. At this point the own ship display range scale is expanded. | Indicates that aircraft is actively separating using the AILS alerting algorithms. |

TABLE 1-continued

CASPER Operational Modes

| Mode | Equipped | Eligible | Armed | Active |
|---|---|---|---|---|
| | | an aircraft has been assigned a CASPER approach but hasn't dialed in the approach correctly. | | |
| Where | Full-time. | Within range of Satellite Landing System. | Downwind base, extended final; Wide part of the AILS Path Boundary (rocket ship). | Final approach; Narrow part of AILS Path Boundary (rocket ship). |
| Who is responsible for separation? | ATC with TCAS as backup for collision avoidance. | ATC with TCAS as backup for collision avoidance. | ATC with TCAS is backup for collision avoidance. | Pilot responsible for separation assurance for aircraft on parallel approaches with AILS support. ATC provides warnings for "errant" aircraft not on approaches. TCAS is backup for collision avoidance for non-CASPER targets. |
| Conditions to Set as TRUE | Aircraft has TCAS II with CASPER/AILS algorithms and modified Mode S transmitter installed. | Equipped. Pilot has selected a CASPER approach and successfully received that approach from the ground station. | Equipped and Eligible. Aircraft is broadcasting and receiving CASPER-specific ADS-B messages. All Eligible aircraft have valid ADS-B position (as checked with radar position). Own ship navigation FOM is valid. | Equipped, Eligible, and Armed. Aircraft is on the narrow part of the AILS Path Boundary (rocket ship). |
| Conditions to Set as FALSE | Equipment de-installed. | Default. | Default. | Default. Aircraft is on a missed approach. Aircraft has blundered too far from assigned runway (crosses parallel runway). |

CASPER Equipped

Figure 4:
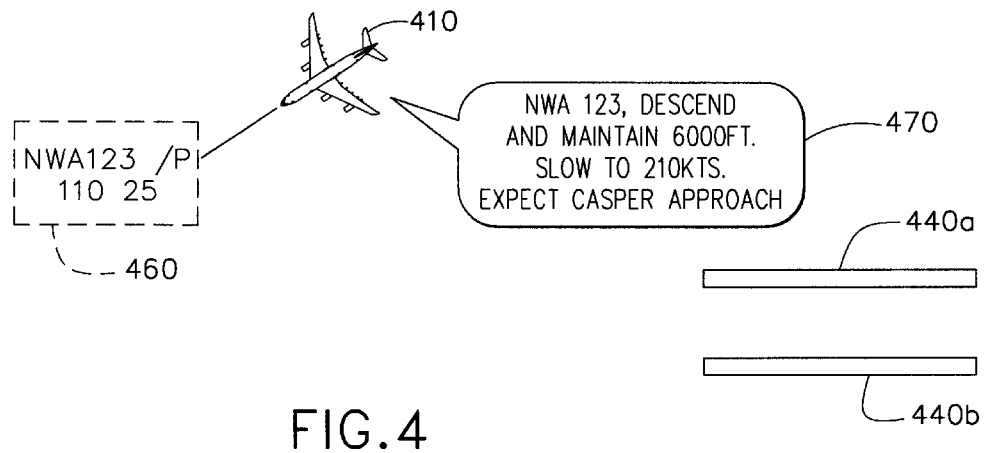
FIG. 4 is a plan view of an aircraft obtaining clearance for an approach to a parallel runway in accordance with one embodiment of the invention.

The fact that the aircraft is equipped with a Mode S capable of both generic and event-driven ADS-B messages will be reflected by a unique identifier in the Mode S identifier block on the ATC's plan view display. FIG. 4 is a plan view of own ship 410, with identifier block 460, approaching closely-spaced parallel runways 440a and 440b, and depicting radio communications associated with approaching own ship 410 in a conversation bubble 470. The unique identifier provides ATC personnel with advance notification that the aircraft is capable of accepting a CASPER approach, therefore eliminating the need for the extra spacing usually required for dependent parallel approaches.

CASPER Eligible

Figure 5:
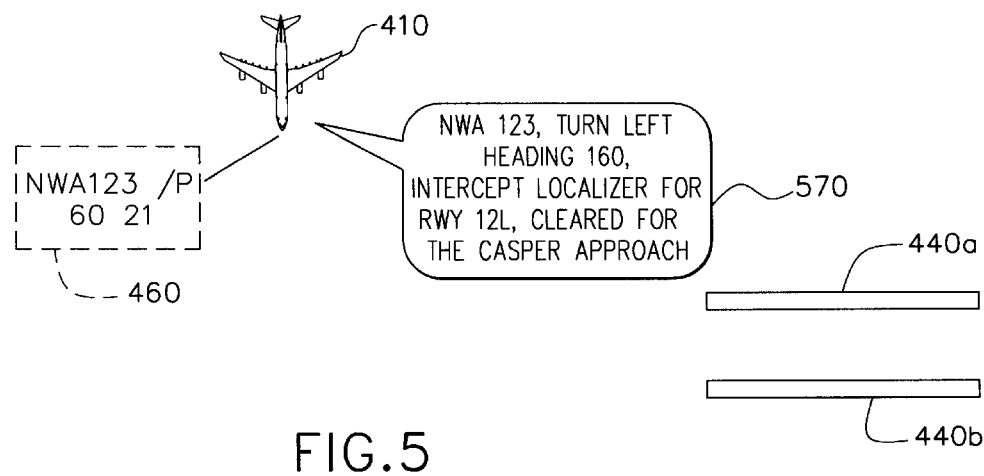
FIG. 5 is a plan view of an aircraft making an approach to a parallel runway in accordance with one embodiment of the invention.

The following description presumes a nominal approach. First, the pilot receives clearance from Air Traffic Control (ATC) to perform a CASPER approach. Next, the pilot dials in the specified CASPER approach using the Control Display Unit of the Flight Management System or a control-head dedicated to the Satellite Landing System. Once the aircraft is within range of the ground station, the approaches for the local airport are received by the aircraft VDLU. The VDLU demodulates the radio signal and passes the approach information to the GNSSU, which selects approach data corresponding to the approach selected by the pilot. Once the CASPER approach is confirmed, the aircraft is eligible to perform a CASPER approach. This is indicated to the ground and other aircraft by the mode flag Eligible. FIG. 5 is a plan view of approaching CASPER-equipped aircraft, own ship 410, depicting radio communications associated with own ship 410 regarding clearance for a CASPER approach in a conversation bubble 470.

Once the CASPER approach is confirmed (mode transition to Eligible), transmission and receipt of CASPER-specific ADS-B messages begins.

CASPER Armed

Once Eligible, integrity checking of messages from all the other CASPER-Eligible aircraft is initiated. The integrity check is performed by comparing the TCAS range and the ADS-B range to determine if the two position estimates are adequately correlated.

Figure 6:
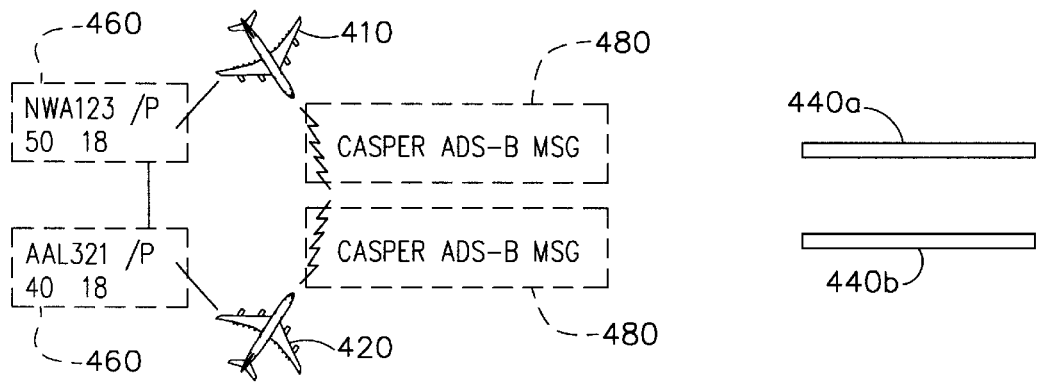
FIG. 6 is a plan view of multiple aircraft making approaches to parallel runways in accordance with one embodiment of the invention.

In addition, the navigation FOM is checked for own ship and other aircraft. Aircraft should not perform a CASPER approach if potential CASPER targets might have degraded or failed navigation data or ADS-B messages. The CASPER system is considered to be Armed (ready to do an approach with trajectory alerting) if the ADS-B messages pass the integrity check and all aircraft FOM are within range. For convenience, all aircraft that are either unequipped to perform CASPER approaches, in Equipped mode or in Eligible mode, but not in Armed mode or Active mode, will be referred to as unarmed aircraft. FIG. 6 is a plan view of approaching CASPER-eligible aircraft, own ship 410 and other ship 420, indicating the ADS-B messages 480 transmitted by both aircraft. Each CASPER-eligible aircraft is a CASPER target to the other aircraft.

CASPER Active

Figure 7:
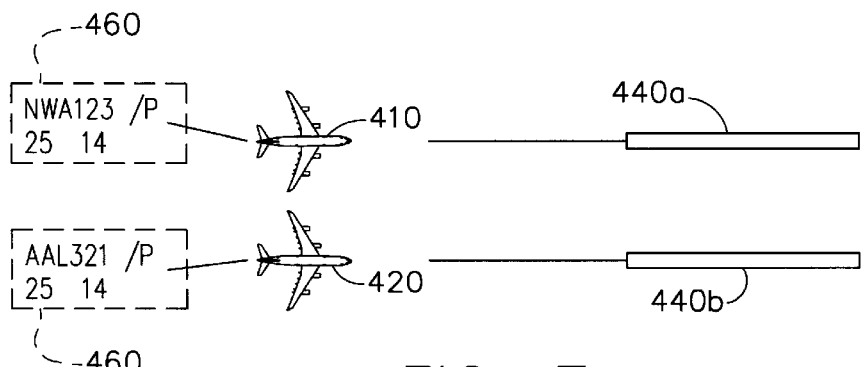
FIG. 7 is a plan view of multiple aircraft making approaches to parallel runways in accordance with one embodiment of the invention.

Once the aircraft are near the extended runway centerline, the two position estimates (from TCAS and ADS-B) are determined to be adequately correlated and the ADS-B messages are determined to be of sufficient integrity, the CASPER system will inhibit Resolution Advisories for CASPER targets and provide blunder protection for those aircraft. At this point, the pilots, with the support of the CASPER system, are responsible for lateral separation assurance. FIG. 7 is a plan view of approaching CASPER-active aircraft, own ship 410 and adjacent ship 420, making CASPER approaches.

The CASPER system, from the pilot's viewpoint, is similar to TCAS in that a collision alert requires immediate action in executing the evasive maneuver. Unlike TCAS, however, the evasive maneuver is envisioned to be procedural in nature, consisting of a climbing turn away from the parallel runway.

Blundering Aircraft

Figure 8:
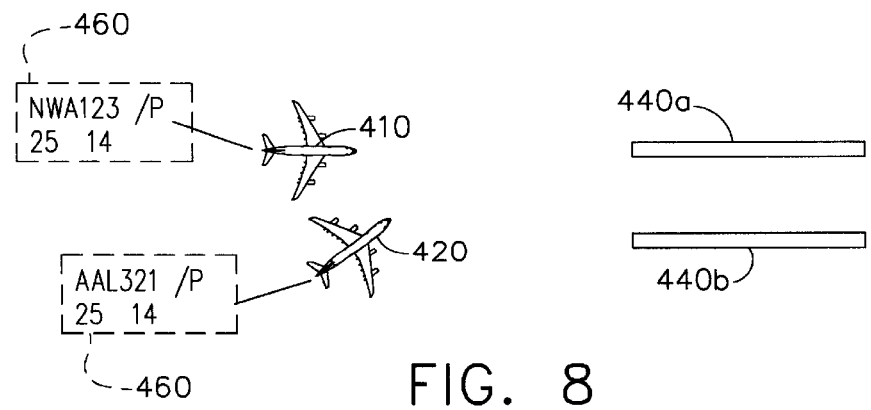
FIG. 8 is a plan view of multiple aircraft making approaches to parallel runways in accordance with one embodiment of the invention.

If a CASPER target blunders and ignores the navigation alerts generated by the AILS algorithm, the CASPER system will sound an alert. FIG. 8 is a plan view of approaching aircraft, own ship 410 and adjacent ship 420, showing adjacent ship 420 to be blundering from its assigned approach. Adjacent ship 420 is thus a threat to own ship 410.

If the deviating aircraft adjacent ship 420 continues to blunder, an alert is annunciated and the aircraft should perform an Emergency Escape Maneuver (EEM), turning away from the parallel traffic and initiating a climb to the Missed Approach Procedure (MAP) altitude. AILS will alert for an EEM for all aircraft that have the blunderer as a CASPER target once the blunderer crosses the centerline between the runways. Once the aircraft are on a missed approach, the blunderer will be treated as a TCAS threat. The blunderer will transfer from Active to Armed once it crosses the parallel runway.

"Normal" Missed Approaches

Once an aircraft is on a missed approach, for whatever reason (e.g., pilot cannot see runway environment at Decision Height, equipment failure or other reason), the CASPER system changes modes from Active to Eligible and all surrounding aircraft are transferred from CASPER targets to TCAS targets. If an aircraft finds that one of its CASPER targets is no longer Active, it should transfer that aircraft from a CASPER target to a TCAS target.

The aircraft will execute the published MAP and receive vectors from ATC to sequence it back into the landing pattern.

Missed Approach vs. Emergency Escape Maneuver

The MAP should remain unchanged from its fundamental structure and function as currently used and recognized in the art. The MAP will be a much more common event than the Emergency Escape Maneuver (EEM) resulting from an alert as part of a system to support Closely-Spaced Parallel Approaches (CSPA). Pilots elect to execute a MAP for a variety of operational reasons, including, but not limited to, the following: the airport environment cannot be visually acquired at Decision Height, an equipment malfunction during the approach (e.g., a generator drops off-line), or the runway environment is not clear (runway transgression).

The EEM is only in response to an ALERT that an aircraft on the parallel runway is threatening own ship. The quickest way to resolve the hazardous proximity is to turn away from the other aircraft and climb.

The turn-climb maneuver, if executed with the frequency of MAPs, would become an operational nuisance because of the effect on the surrounding airspace. The EEM is 'proceduralized' so that the flight crew can execute the maneuver the moment an alert is sounded. It is anticipated that the controller would issue vectors to the aircraft that have departed the Final Approach path to sequence those aircraft back into the traffic pattern.

The EEM LOST COMM situation can be accommodated by using the following approach. Upon reaching the MAP altitude (this altitude will be site specific, as is the HOLD altitude for each MAP), the aircraft is turned toward the applicable MAP HOLD fix. The aircraft then enters the HOLD using the appropriate entry procedure. The remainder of the EEM LOST COMM procedure would be identical to the MAP LOST COMM procedure.

ADS-B, Navigation, or Other System Failures

If the overall system integrity is violated at any point during the approach because of equipment failure, either airborne or ground-based, the system will annunciate a system failure, an EEM breakout procedure will be executed to initiate the Missed Approach, and TCAS will resume active collision avoidance responsibility.

Automatic Dependent Surveillance (ADS-B)

Figure 9:
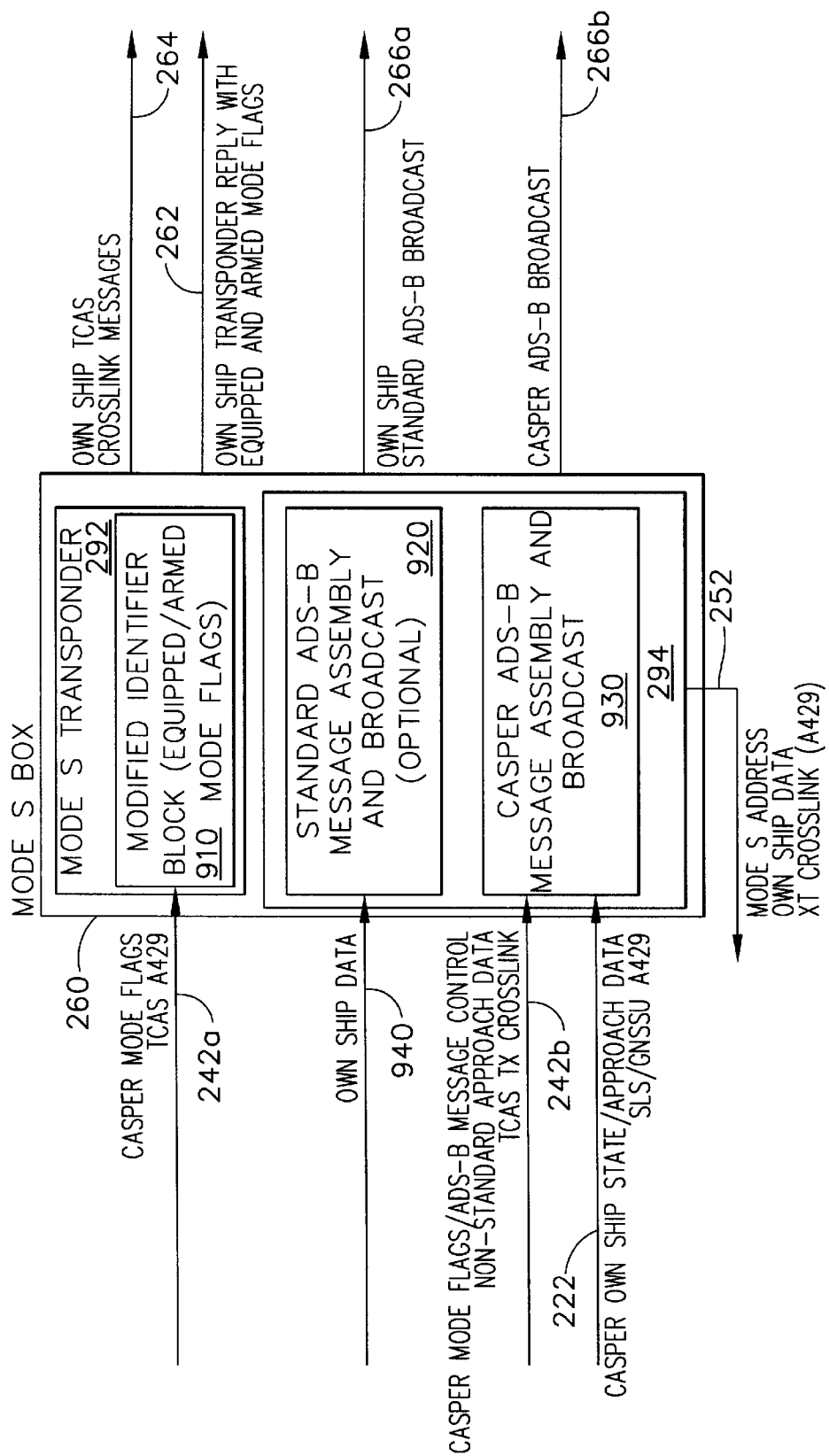
FIG. 9 is a schematic of a Mode S box in accordance with one embodiment of the invention.

FIG. 9 is a block diagram showing greater detail of Mode S box 260. FIG. 9 will be used to better describe the Automatic Dependent Surveillance-Broadcast (ADS-B) communications, all of the data communication into and out of the Mode S box, and Mode S communications with ATC. Mode S transponder 292 is further shown to contain modified identifier block 910. ADS-B transponder 294 is further shown to contain an optional standard ADS-B message assembly and broadcast module 920 and a CASPER ADS-B message assembly and broadcast module 930.

Modified identifier block 910 accepts CASPER mode flags from TX crosslink 242a and provides output as own ship transponder reply 262 containing the Equipped and Armed mode flags.

Standard ADS-B message assembly and broadcast module accepts own ship data 940 and provides output via own ship ADS-B messages 266*a* containing standard ADS-B broadcasts. CASPER ADS-B message assembly and broadcast module 930 accepts CASPER mode flags, ADS-B message control and non-standard approach data via TX crosslink 242*b*, and CASPER own ship state and approach data via state and approach data 222. CASPER ADS-B message assembly and broadcast module 930 further provides output via own ship ADS-B messages 266*b* containing CASPER-specific ADS-B broadcasts.

Mode S box 260 further provides Mode S address and own ship data across XT crosslink 252.

Overview of the ADS-B Broadcast

The CASPER algorithms rely on ADS-B communications to receive information from the other aircraft in the area that are planning CASPER approaches. This information consists of an address that uniquely identifies the broadcasting aircraft, high accuracy position and velocity data, CASPER mode flags, and a description of the glidepath.

There are some differences in the information utilized by the various embodiments of the invention and the information contained in a nominal ADS-B transmission defined by the Radio Technical Commission for Aeronautics (RTCA) Special Committee 186 document, Minimum Aviation System Performance Specification for ADS-B. The nominal ADS-B message does not contain glidepath information or CASPER mode flags. Table 2 details some of these differences.

TABLE 2

Nominal ADS-B Transmission as Defined in the RTCA Special Committee 186 Minimum Aviation System Performance Specification

| | | |
|---|---|---|
| Identification | Call sign | Only required for aircraft/vehicles receiving air traffic services |
| | Address | For aircraft with a mode S transponder, the mode S and ADS-B addresses will be the same |
| | Category | For example, light, medium, heavy, high performance, skydiver, surface vehicle |
| State Vector | Horizontal latitude and longitude position | |
| | Altitude | |
| | Navigation position uncertainty category | |
| | Horizontal velocity vector | Defined as north-south and east-west velocity relative to the WGS-84 ellipsoid |
| | Altitude rate | Geometric altitude rate shall be reported for high accuracy navigation systems |
| | Navigation velocity uncertainty category | |
| | Airborne turn indication | Indicates if the aircraft is turning left, turning right, or not turning |
| Status/Intent | Emergency/priority status | |
| | Current trajectory change point (TCP) | Consists of three-dimensional position where trajectory is planned to change and the estimated flight time to that point |
| | Next trajectory change point (TCP + 1) | Consists of three-dimensional position where trajectory is planned to change beyond the current trajectory change point and the estimated flight time to that point |

TABLE 2-continued

Nominal ADS-B Transmission as Defined in the RTCA Special Committee 186 Minimum Aviation System Performance Specification

| | |
|---|---|
| Class code | The class code indicates the capability of a participant to engage in specific operations |

Although the nominal ADS-B message contains position and velocity information, the minimum accuracy, latency, and report time error specifications for this data as specified in the ADS-B Minimum Aviation System Performance Specification may not be sufficient to support the CASPER application. Table 3 provides recommended allowable state vector errors. In addition, the data as specified in the ADS-B Minimum Aviation System Performance Specification is not time stamped. Various embodiments of the invention utilize UTC time to synchronize the own ship and other ship data.

TABLE 3

State Vector Error Budget for ADS-B as Defined in the RTCA Special Committee 186 Minimum Aviation System Performance Specification

| State Vector Component | Error Budget |
|---|---|
| Horizontal position | $\sigma = 20$ m |
| Horizontal velocity | $\sigma = 0.25$ m/s |
| Vertical position | $\sigma = 30$ ft |
| Vertical velocity | $\sigma = 1$ ft/s |

Because of these discrepancies between the desired and nominal data exchange, the ADS-B information required by CASPER will be broadcast as what is known as an on-condition report or message. The ADS-B broadcast rate should be matched to processing rate of the CASPER algorithms. The recommended rate for processing of the CASPER algorithms is 1 Hz, so the ADS-B broadcast rate should be sufficient to provide the ADS-B report at 1 Hz. It is noted that the invention is operational at data rates other than 1 Hz, but that 1 Hz is identified as a desired rate for system response time and related safety considerations If the standard ADS-B broadcast becomes time tagged and sufficiently accurate and timely, the aircraft position and velocity could be broadcast and received in a standard ADS-B message, while the CASPER mode flags and glidepath description, or approach data, could be broadcast and received in an on-demand message. Other methods and apparatus may be used to provide the position, velocity, mode flags and glidepath description to the CASPER algorithms.

Mode S Communications With Air Traffic Control

To facilitate efficient implementation of the invention, the controllers on the ground need some of the same information that the other aircraft do about the state of the CASPER system. Controllers can get this information via ADS-B, as the other aircraft do. However, it is noted that most airports are not equipped to receive ADS-B messages at the present. As an alternative, the mode of the CASPER system may be communicated using the Mode S identifier block. The ground will then know: 1) if an aircraft is equipped to do CASPER approaches, i.e., Equipped; and 2) if the aircraft has successfully dialed in the CASPER approach and is broadcasting and receiving ADS-B messages from other aircraft, i.e., Armed.

Starting and Stopping the CASPER-Specific ADS-B Broadcast

The CASPER-specific ADS-B broadcast need not be continuous. Such broadcasts are only required when aircraft are near the destination airport. Accordingly, it is desirable to implement ADS-B message control for the CASPER-specific broadcast.

The broadcast and reception of the CASPER-specific ADS-B report starts once the aircraft has a confirmed approach from the SLS. The system should also check that the aircraft is in the vicinity of the destination airport, which, for purposes of this description, is defined as being within 50 nm of the runway threshold. This value is arbitrary and is with the discretion of the designer.

The CASPER-specific ADS-B broadcast stops once the aircraft lands or is no longer in the vicinity of the destination airport for which the SLS approach was confirmed. For purposes of this description, an aircraft that has landed is an aircraft with a speed of less than 50 knots. This value is arbitrary and is within the discretion of the designer. By the definition in the preceding paragraph, an aircraft is no longer within the vicinity of the destination airport if it is more than 50 nm from the runway threshold for the confirmed CASPER approach.

Continuous determination of whether aircraft are in the vicinity of the airport are desirable to prevent inappropriate mode flags. As an example, once the pilot tunes in an approach, and the CASPER approach confirmed flag is set to TRUE, it is only reset if the pilot detunes the approach on the FMS or Control Unit or selects another approach. In the case of a last minute diversion to another airport, this may not be done in a timely fashion by the pilot or crew. Thus, an airport vicinity check is used to both start and stop CASPER-specific ADS-B communications.

The ADS-B integrity monitor checks the validity of the other ship ADS-B reports. The integrity monitor checks two things. First it checks how current the ADS-B report is. Second, it checks the validity of the data in the report. The ADS-B integrity flags are set based on the results of these checks in accordance with Table 4.

TABLE 4

ADS-B Integrity Status Flags

| Flag | Condition to Set as TRUE |
| --- | --- |
| VALID | RANGE INVALID, OLD, and VERY OLD are all FALSE and ADS-B reports are available |
| RANGE INVALID | Radar range test failed |
| OLD | ADS-B report more than 6 seconds old |
| VERY OLD | ADS-B report more than 15 seconds old |

The age of the ADS-B report is an issue during two phases of the approach. When the aircraft is on the extended approach, i.e., Eligible mode, before the AILS separation algorithms are active, there is no need to use the ADS-B reports for separation. However, there should be some assurance that the ADS-B communications are working before the aircraft is transitioned to the Armed mode. A dropout of 15 seconds during the extended approach is the recommend maximum to be tolerated before declaring that ADS-B communication from another aircraft has stopped. Upon deeming ADS-B communication from another aircraft has stopped, the VERY OLD integrity status flag will be set to TRUE.

The age of the ADS-B report is critical when the aircraft is in the Active mode, since the ADS-B navigation data is used by the AILS algorithms for self-separation. Using simulation analysis, Applicant has found that a dropout of approximately 6 seconds can be reasonably tolerated before declaring the ADS-B information for the other aircraft invalid and setting the OLD integrity status flag to TRUE.

It is difficult to provide an independent check on the information in the ADS-B message, since this is information provided by another aircraft about that aircraft.

However, the radar range may be utilized as an independent check on the ADS-B position information. Radar slant range is accurate to about 100 feet after filtering, with a quantization error of another 125 feet. Since the HFOM and VFOM for own ship and other ship are known, a bound on the error between the radar slant range and computed ADS-B range may be established. It is important to take timing errors into account when setting the bound on the error. The recommended equation for setting the range check threshold is:

$$\text{range threshold} = 3 * \left[ \left(\frac{HFOM}{2}\right)^2_{OS} + \left(\frac{VFOM}{2}\right)^2_{OS} + \left(\frac{HFOM}{2}\right)^2_{AJ} + \left(\frac{VFOM}{2}\right)^2_{AJ} + \left(\frac{100 \text{ ft}}{3}\right)^2 + \left(\frac{125}{\sqrt{12}}\right)^2 \right]^{1/2}$$

Where: OS represents own ship.
AJ represents adjacent ship.
HFOM and VFOM are expressed in meters.
Range threshold is expressed in feet.

Defective ADS-B data is handled in a manner consistent with the phase of the approach and the part of the data that is bad. If own ship is on the extended approach and is Eligible but not Active, ADS-B integrity is checked for every other ship that is Eligible. If all aircraft have VALID ADS-B integrity, own ship mode may be set to Armed.

If own ship is Active, ADS-B integrity is checked for every ship that is Active and a candidate or current CASPER pair, that is, an adjacent ship. If the other ship is a candidate CASPER pair and RANGE INVALID or OLD, the other ship remains a TCAS target. If the other aircraft is a current CASPER pair and RANGE INVALID, a missed approach is performed. An invalid range may be the result of problems with own ship or the other ship. The missed approach is performed for safety reasons in this situation as the source of the problem is generally indeterminable. If the other ship is a current CASPER pair and OLD, the other ship becomes a TCAS target.

Outputs From Mode S Box to TCAS Box

The CASPER algorithms need own ship state and approach data and the Mode S identifier address from the Mode S box. Own ship data from the SLS/GNSSU is input to the TCAS box after first being input to the Mode S box and then going from the Mode S box to the TCAS box via the XT crosslink.

The Mode S identifier address is currently a standard input into the TCAS box, and is used by the TCAS algorithms, so the signal format, units, and resolution are predefined.

When the own ship state and approach data is passed to the TCAS box via the XT crosslink, it should have the same signal, format, units, and resolution as it did when input to the Mode S box, with one exception. The assigned runway should be extracted from the Procedure message and only those bits passed into the TCAS box. The remainder of the inputs to the Mode S box from the SLS/GNSSU are not required.

The ARINC labels may or may not be used. The XT crosslink has the ability to load data directly into registers, eliminating the need to use ARINC labels for some of the data.

Inputs to Mode S Box From TCAS Box

The data transferred from the TCAS box to the Mode S box on the TX crosslink is not currently part of a standard product output. Thus, signal format and units, range, significant bits, and resolution of this data need to be defined and specified.

The glideslope angle, threshold crossing height, datum point height, datum point latitude, and datum point longitude are standard inputs to the SLS, communicated from the ground via the VDLU link. Resolution, range, and units for this data may be the same as those for the SLS. The AILS path length and localizer slew angle are not part of the standard approach data, thus range and resolution for these data are determined by good operational judgment.

The CASPER mode and CASPER ADS-B message control flags are the remaining data that need to be communicated from the TCAS Box to the Mode S box. The CASPER mode has four states, i.e., Equipped, Eligible, Armed, and Active. The CASPER ADS-B message control flag has two states (ON and OFF). Together, the CASPER mode and CASPER ADS-B message control flags utilize 3 bits of data.

CASPER Alerting Function

TCAS (Traffic Alert and Collision Avoidance System) is a collision avoidance system currently mandated for all aircraft in the U.S. with 20 passengers or more. TCAS provides important traffic alerting and resolution advisories, but the system is not designed for the special problem of aircraft on parallel approaches. The current TCAS, because of limitations of the surveillance technology, does not provide resolution advisories below 1,000 feet. In addition, TCAS will generate nuisance alerts for two aircraft on parallel approaches if they are within about 2,500 feet of one another, even if the approaches are blunder free.

The AILS algorithms within the CASPER system provide separation assurance for aircraft on parallel approaches. For aircraft that are CASPER targets (that is, aircraft for which CASPER alerting is being performed), the TCAS traffic and resolution advisories for those specific aircraft may be suppressed. In this manner, TCAS protection is maintained without extraneous traffic and resolution advisories.

Figure 10:
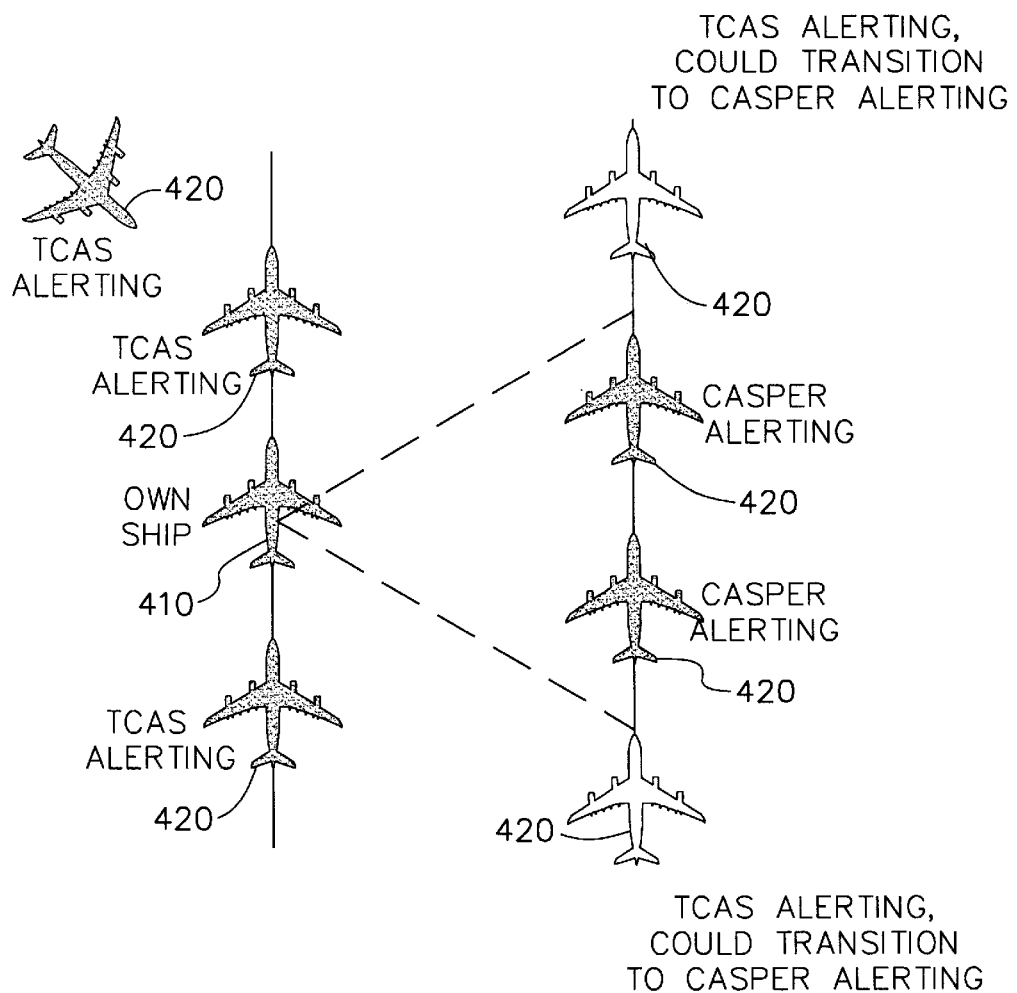
FIG. 10 is a plan view of multiple aircraft in accordance with one embodiment of the invention.

FIG. 10 summarizes those instances where conventional TCAS alerting is utilized and where it may be appropriate to rely solely on CASPER alerting. In FIG. 10, own ship 410 is depicted in relative position to a variety of other ships 420. Zone 1010 defines a zone relative to own ship 410 where it would be appropriate to rely solely on CASPER alerting along a parallel approach. Outside of zone 1010, TCAS alerting would be utilized.

With reference FIG. 10, and with further reference to FIG. 7, zone 1010 is generally defined as an area extending perpendicularly between own ship 410 and a line parallel to parallel runway 440b, wherein the line is laterally displaced from own ship 410 by a distance substantially equal to a separation distance between parallel runway 440a and parallel runway 440b. There is no absolute size or shape required for zone 1010 inherent in the invention. Zone 1010 is used as a decision tool to define when an adjacent ship will be monitored using the AILS algorithms for parallel approaches and when alternate alerting methods should be utilized.

Integrating the CASPER Algorithms With TCAS
Overview

The CASPER system contains logic to selectively identify the aircraft on which the AILS algorithms will be used, as well as the AILS algorithms for performing the collision avoidance function. A functional flow diagram outlining how the CASPER system integrates into TCAS hardware/software is provided in FIG. 11.

Figure 11A:
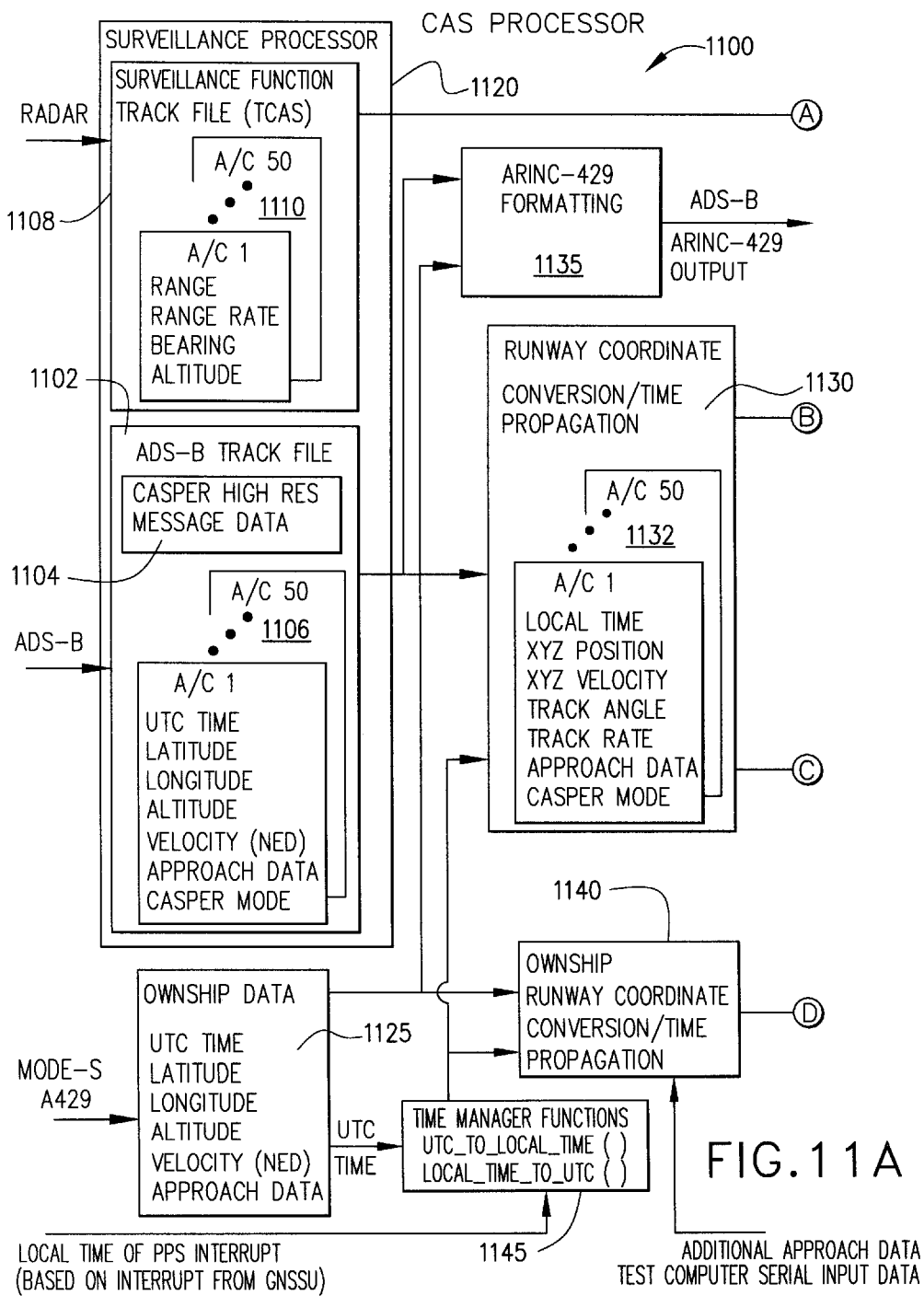
FIG. 11 is a schematic of a processor adapted to carry out methods of an embodiment of the invention.
Figure 11B:
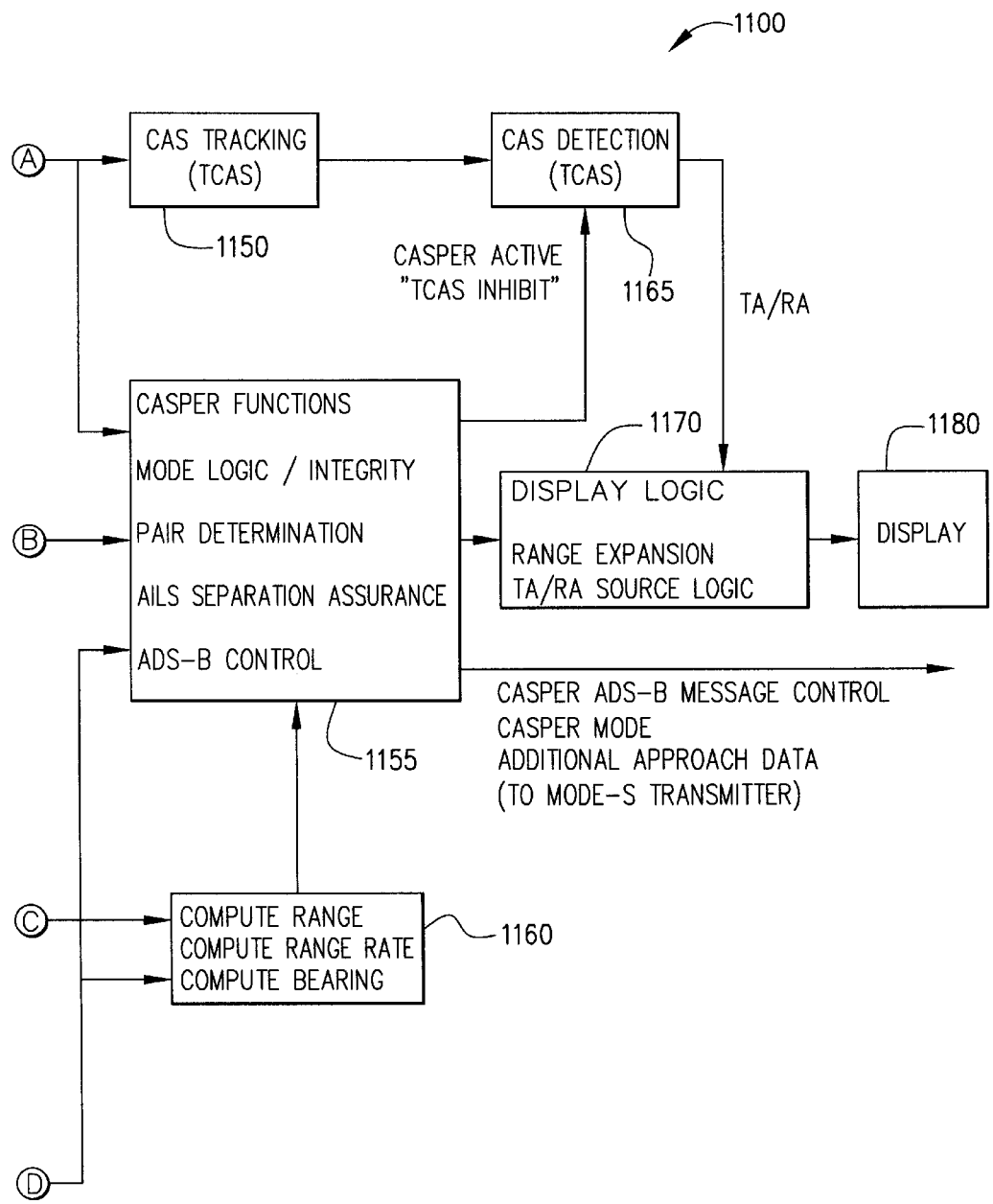

FIG. 11 not only outlines the TCAS/CASPER interaction but also identifies functions required for the CASPER system which are also required for a "TCAS-like" ADS-B Cockpit Display of Traffic Information (CDTI). FIG. 11 separates functions which reside in the surveillance processor 1120, from functions which reside in the CAS processor 1100.

Surveillance processor 1120 contains surveillance function track file processing 1108, which supports TCAS, and ADS-B track file processing 1102, which is specific to the CASPER system. Surveillance function track file processing 1108 further contains aircraft track file elements 1110 for tracking information corresponding to individual other ships. ADS-B track file processing 1102 further contains CASPER modification block 1104 and aircraft track file elements 1106 for tracking data corresponding to individual other ships. Track file elements 1110 contain information relative to a frame of reference corresponding to own ship, and commonly include the following data: range, range rate, bearing and altitude. Track file elements 1106 contain information in a geographic coordinate system, such as WGS-84, and generally include the following data: UTC time, latitude, longitude, altitude, velocity (NED; North/East/Down), approach data and CASPER mode.

Surveillance function track file processing 1108 accepts input from radar and provides output to CAS tracking block 1150, which in turn provides output to CAS detection block 1165. CAS detection block 1165 is coupled to display logic 1170 to provide output to display 1180 for auditory and/or visual observation by an observer, such as own ship pilot or crew, or ATC or other ground-based observer. Surveillance function track file processing 1108 further provides output to function block 1155.

ADS-B track file processing 1102 accepts input from received ADS-B messages and provides output to ARINC-429 formatting block 1135 and other ship conversion block 1130.

Own ship data 1125 accepts input from Mode-S box 260 (not shown) and provides output to own ship conversion block 1140 and time manager functions 1145. Own ship data 1125 is similar to track file elements 1106, containing information relative to a geographic coordinate system, and including the following data: UTC time, latitude, longitude, altitude, velocity (NED) and approach data. Own ship data 1125 provides output to ARINC-429 formatting block 1135, own ship conversion block 1140 and time manager functions 1145.

Time manager functions 1145 accepts local time of PPS interrupts as an input, along with UTC time from own ship data 1125. Time manager functions 1145 provide output to own ship conversion block 1140 and other ship conversion block 1130.

Other ship conversion block provides output to function block 1150 and computation block 1160. Own ship conversion block further provides output to function block 1150 and computation block 1160.

Function block 1155 provides output to CAS detection block 1165 as well as display logic 1170. Function block 1155 further provides ADS-B message control, mode and additional approach data to the Mode S box 260 (not shown).

Additional details for each CASPER-related function of FIG. 11 are provided in the following subsections.

ADS-B Track File Processing

A track file element 1102 containing the ADS-B related information for each other ship is required. Track file elements 1102 are similar to the track file elements 1110 provided by the TCAS surveillance function from radar measurements, except the information is in a geographic coordinate system rather than a relative system. It is expected that the CASPER alerting system will require higher resolution and higher rate ADS-B messages than the standard extended squitters to avoid sacrificing safety, therefore a CASPER modification block 1104 is shown in the ADS-B track file processing 1102 to provide higher resolution data and rates in the ADS-B messages. In addition to position and velocity squitters, the CASPER alerting system will also broadcast approach and mode data. Messages related to these CASPER-specific broadcasts are received, formatted and stored within the track file elements 1106.

Currently, every aircraft equipped with a Mode S transponder spontaneously radiates, i.e., squitters, its unique Mode S address once per second in a 56-bit burst at 1090 MHZ. TCAS uses this information to detect the presence of nearby aircraft equipped with Mode S transponders. The GPS-squitter concept, also known as extended squitter, adds two additional 112-bit squitter messages. One message is radiated every half second and contains GPS position and barometric altitude when the aircraft is airborne; or position, heading, and speed when the aircraft is on the surface. The other message is radiated every five seconds and contains the aircraft flight number, or the aircraft tail number for general aviation aircraft. Existing Mode S transponders can easily be modified to transmit squitter messages aside from, or in addition to, the conventional or extended squitter messages. A software change to the transponder is all that is required. Such software changes are within the abilities of one of ordinary skill in the art.

Own Ship Data

Input for own ship data 1125 is received from Mode S box 260 through the own ship TCAS crosslink messages 264 across the TCAS XT input bus. Own ship data 1125 contain a UTC time-tag, position, velocity and approach data similar to the ADS-B data received for other aircraft. The own ship CASPER mode is computed in the CAS processor 1100 and should be retrieved and attached with the own ship data received from Mode S box 260.

ADS-B ARINC-429 Output

The contents of the track file elements 1106 and own ship data 1125 is output on an ARINC-429 data bus. This allows ADS-B applications to reside in external devices, if data latency does not become a limiting factor. After receipt of a contiguous block of labels, the Mode S identifier can be inspected to identify the ship providing the data.

Time Manager Functions

The purpose of the time manager functions 1145 is to provide the ability to convert UTC time to the local processor (CAS processor) time or vice versa. This is accomplished by time tagging the time mark interrupt sent from the Global Navigation System Sensor Unit (GNSSU) with a local time, and correlating that local time with the UTC time for the interrupt received over the Mode S input bus. The UTC time will be latent, so care must be given to match the interrupt with the proper UTC data.

Mode Logic/Integrity

The CASPER mode logic/integrity function within function block 1155 serves as the CASPER executive within the CAS processor 1100. The CASPER mode logic/integrity function is detailed in FIGS. 12–16. An attempt has been made in FIGS. 12–16 to distinguish between logic and actions. Logical statements/functions are enclosed within rectangular boxes while action enclosures are rounded.

Figure 12:
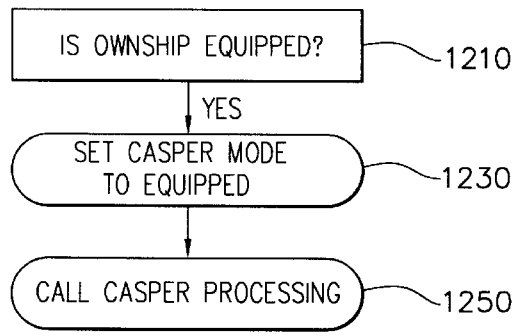
FIG. 12 is a flowchart of logic to determine if an aircraft is equipped to perform an embodiment of the invention.

FIG. 12 provides the elements and actions taken to determine if the system is CASPER equipped. As shown in FIG. 12, a logical function 1210 is encountered to determine if the own ship is CASPER equipped. Logical function 1210 can be a discrete, such as a hardware input or a software switch.

If it is determined that the own ship is equipped, the CASPER mode is set to Equipped in action box 1230 and a call is made to the CASPER processing module in action box 1250. The discrete or software switch is checked at the 1 Hz rate of the CASPER alerting system to enable a 1 Hz call to the CASPER processing module detailed in FIG. 13. Recall that the CASPER mode is output in the Mode S identifier block.

Figure 13:
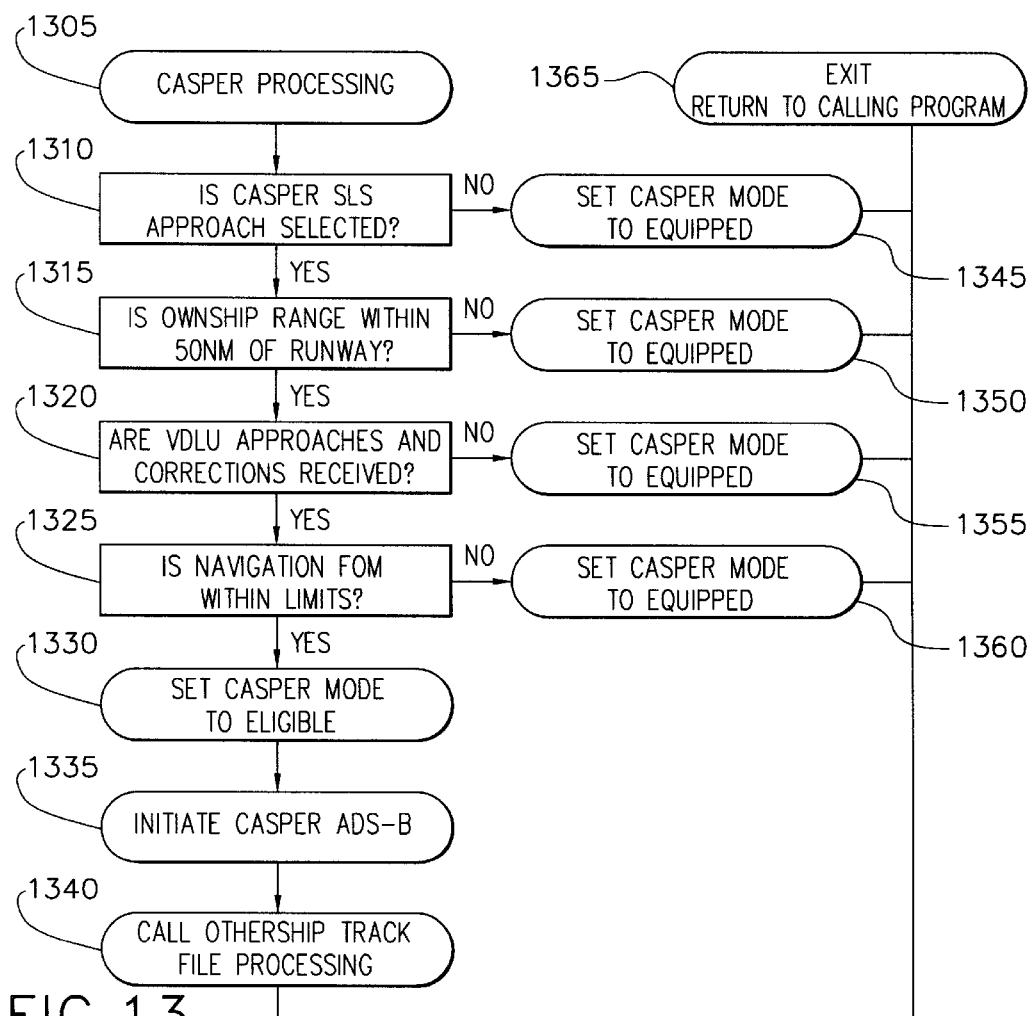
FIG. 13 is a flowchart of processing logic in accordance with one embodiment of the invention.

A flow diagram of the CASPER processing module logic is provided in FIG. 13. CASPER processing begins with action box 1305. At logical function 1310 evaluates whether a CASPER SLS approach is selected. If not, control is transferred to action box 1345 to set the mode to Equipped. If the approach is selected, logical function 1315 evaluates whether own ship is within the vicinity of the airport. If not, control is transferred to action box 1350 to set the mode to Equipped. If within the vicinity, logical function 1320 evaluates whether the VDLU approaches and corrections are received. If not, control is transferred to action box 1355 to set the mode to Equipped. If VDLU approached and corrections are received, logical function 1325 evaluates whether the navigation FOMs are within DGPS navigation limits. If not, control is transferred to action box 1345 to set the mode to Equipped. If the FOMs are within limits, action box 1330 sets the mode to Eligible, action box 1335 initiates CASPER-specific ADS-B messaging and action box 1340 makes a call to ADS-B track file processing. Control from action boxes 1340, 1345, 1350, 1355 and 1360 all transfers to action box 1365 to return to the calling program.

Figure 14A:
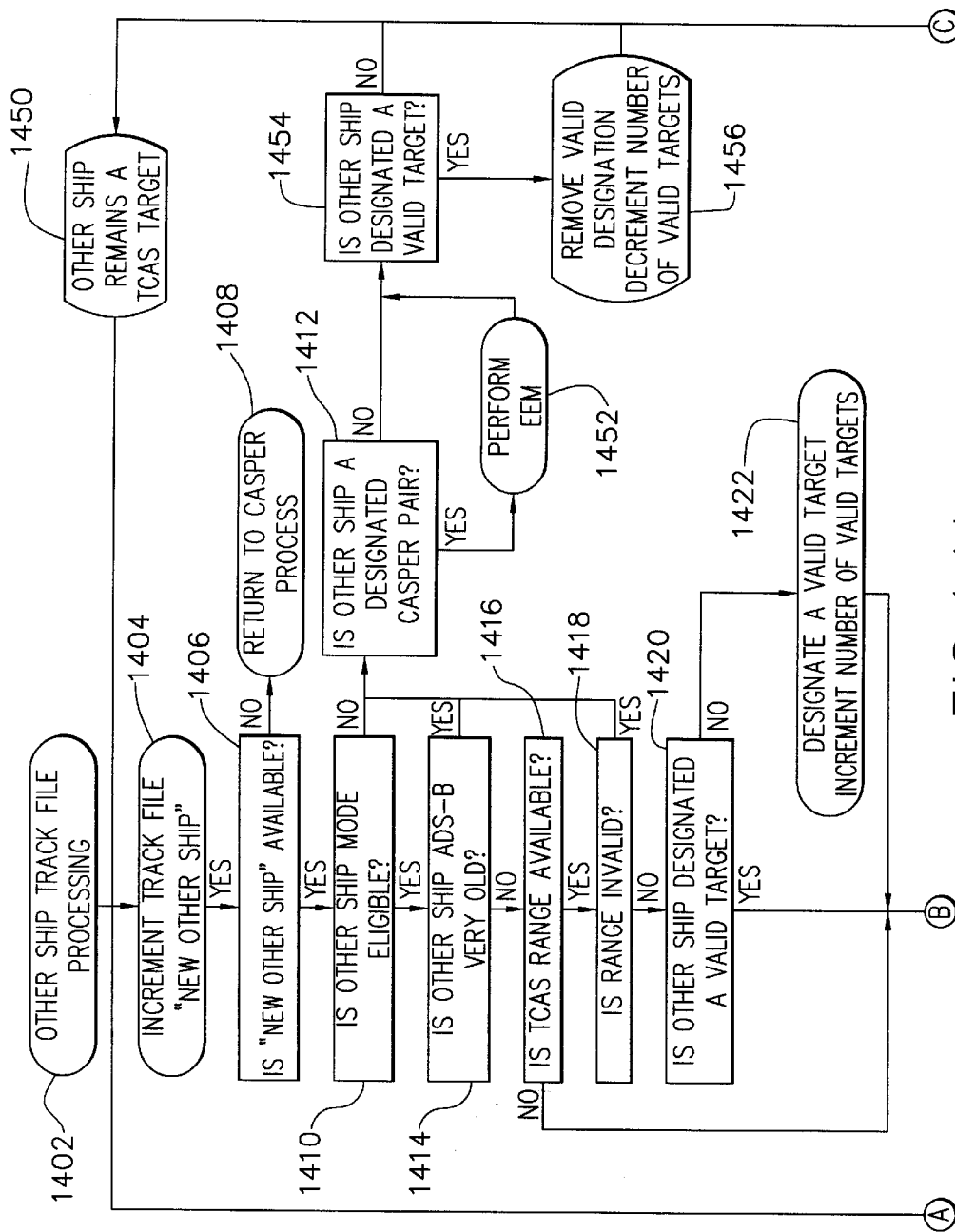
FIG. 14 is a flowchart of track file processing in accordance with one embodiment of the invention.
Figure 14B:
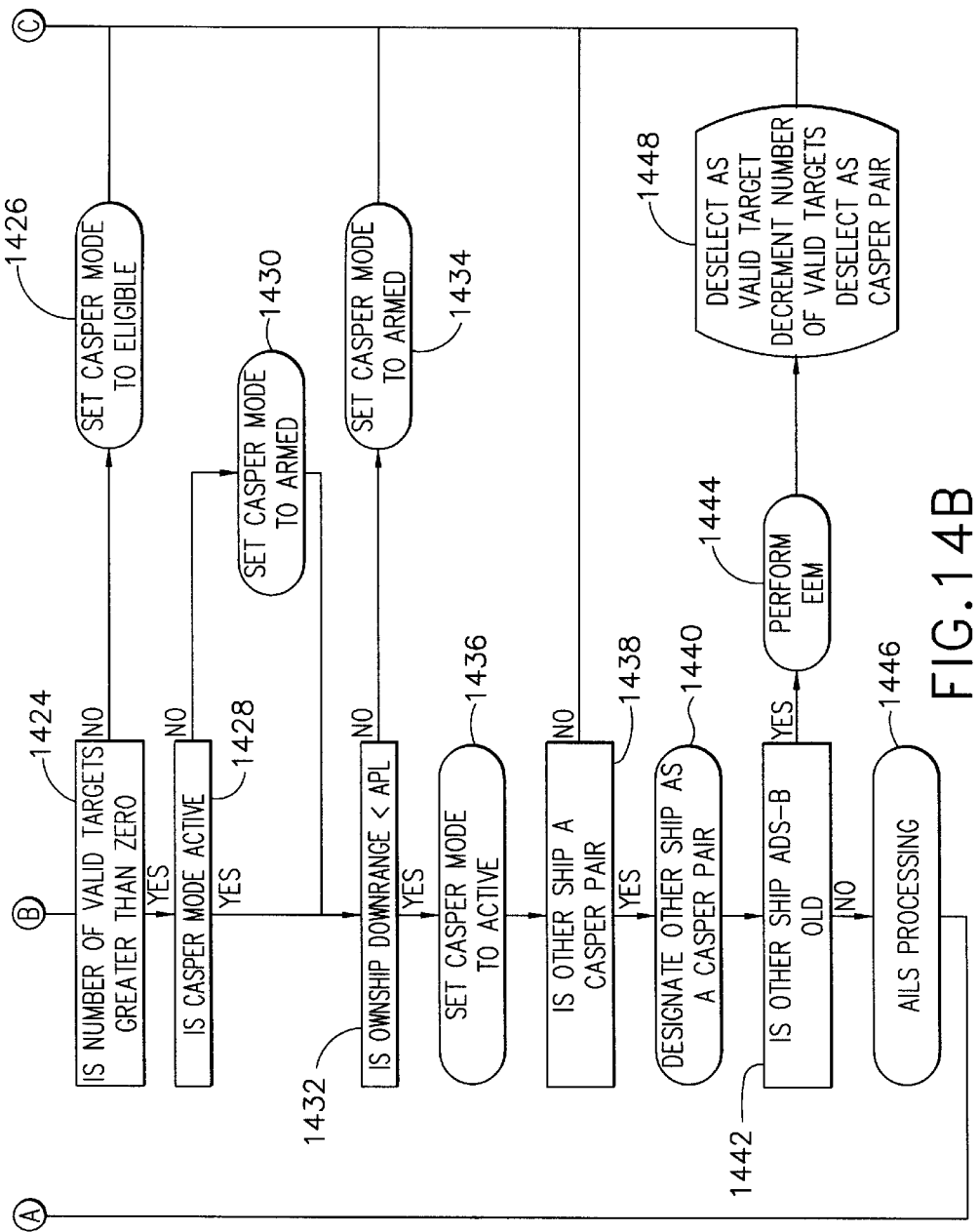
Figure 15:
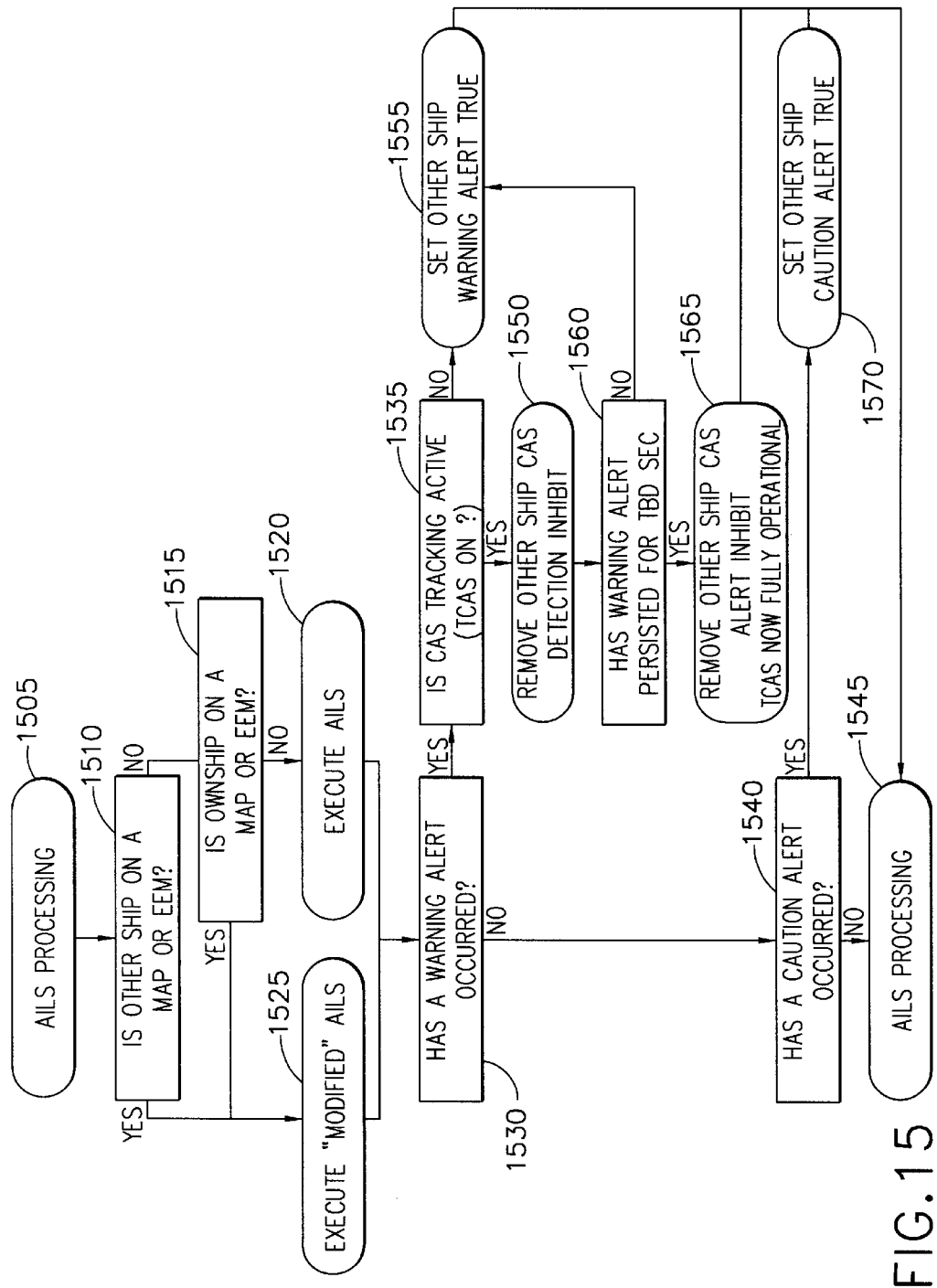
FIG. 15 is a flowchart of separation assurance algorithm processing in accordance with one embodiment of the invention.

The logic/executive flow for other ship track file processing is shown in FIG. 14. This flow diagram represents an inner loop to process information for all other ships for which an ADS-B message has been received. This processing includes an ADS-B integrity check, logic to change mode from Eligible to Armed or Active, determination of CASPER pairs, and a call to execute the AILS separation assurance algorithms.

Other ship track file processing begins at action box 1402. At action box 1404, the track file is incremented to process a new, or the next, other ship. Logical function 1406 evaluates whether the new other ship is available, i.e., if any remaining other ships have yet to be processed. If processing of all available other ships is complete, control is passed to action box 1408 to return to action box 1305. If the new other ship is available, logical function 1410 evaluates whether the other ship mode is Eligible.

If the other ship mode not Eligible, logical function 1412 determines whether that other ship is a CASPER pair. If not, logical function 1454 determines whether the other ship is designated as a valid target. If it is designated as a valid target, action box 1456 removes the designation and decrements the number of valid targets as the other ship is no longer transmitting tracking information when in Eligible mode. If the other ship is not designated as a valid target, action box 1450 maintains the other ship as a TCAS target. If the other ship is a CASPER pair in logical function 1412, action box 1452 indicates the need for an EEM due to the uncertainties surrounding the other ship's tracking information in light of the discontinuance of data transmissions.

If the other ship mode is Eligible, logical function 1414 evaluates whether the ADS-B messaging is VERY OLD. If VERY OLD, control is passed to logical function 1412. If not VERY OLD, logical function 1416 determines whether the TCAS range is available. If not available, control is passed to logical function 1424.

If the TCAS range is available in logical function 1416, logical function 1418 determines whether the range is INVALID. Range validity is determined by comparing the ADS-B derived range to a TCAS derived range. If the difference between the two ranges is greater than a threshold, the range is declared INVALID. The threshold is preferably about 100 m. If the range is INVALID, control is passed to logical function 1412. If the range is not INVALID, logical function 1420 determines whether the other ship is designated as a valid target. If not, action box 1422 designates the other ship as a valid target and increments the number of tracked targets, and passes control to logical function 1424. If the other ship is already a valid target, control is passed to logical function 1424.

Logical function 1424 determines if the number of valid targets is greater than zero. If the number of valid targets is zero, action box 1426 sets the CASPER mode for the other ship in the track file as Eligible. If the number of valid targets is greater than zero, logical function 1428 determines whether the CASPER mode of the other ship is Active. If not, action box 1430 sets the CASPER mode for the other ship to Armed. If already Active, logical function 1432 determines whether own ship is downrange of the other ship and within the AILS path length. In not downrange and within the AILS path length, action box 1434 sets the CASPER mode for the other ship to Armed and transfers control to action box 1450. If downrange and within the AILS path length, action box 1436 sets the CASPER mode of the other ship to Active.

Upon setting the mode to Active, logical function 1438 determines whether the other ship is a CASPER pair to own ship. If not, control is passed to action box 1450. If the other ship is a CASPER pair, action box 1440 designates the other ship as a CASPER pair. Logical function 1442 determines whether the ADS-B messaging is OLD for the designated CASPER pair. If OLD, action box 1444 indicates the need for an EEM followed by action box 1448 to deselect the other ship as a valid target, decrement the number of valid targets and deselect the other ship as a CASPER pair. Control is then passed to action box 1450. If ADS-B messaging is not OLD, AILS separation assurance algorithms are utilized in action box 1446 to evaluate whether the other ship is a threat to own ship. Control is then returned to action box 1404 to repeat the processing for the next other ship. Additional detail on the processing of the separation assurance algorithms is provided in FIG. 15.

Action box 1505 signals the initiation of AILS processing. Logical function 1510 first determines whether the other ship is on a MAP or EEM. If the other ship is not on a MAP or EEM, logical function 1515 determines whether own ship is on a MAP or EEM. If own ship is also not on a MAP or EEM, action box 1520 executes the separation assurance algorithms. If either the other ship or own ship are on a MAP or EEM, a modified set of separation assurance algorithms are performed in action box 1525. The modified set of separation assurance algorithms use actual states rather than intent for the ship the is executing the MAP or EEM.

Upon executing either of the separation assurance algorithms on the tracking information, logical function 1530 determines whether a warning alert occurred as a result of the algorithms. If no warning occurred, logical function 1540 determines whether a caution has occurred. If no caution has occurred, control is passed to action box 1545 to repeat the separation algorithm processing. If a caution has occurred, action box 1570 sets the other ship caution alert to true for output to the display logic function 1170 for alerting an observer. Control is passed to action box 1545 to repeat the processing.

If a warning occurred in logical function 1530, logical function 1535 determines whether the CAS tracking function of TCAS is active on the particular other ship. If true, the CAS detection inhibit for that other ship is removed in action box 1550 and a check for how long the warning has persisted is made in logical function 1560. If the warning has persisted for five seconds, the TCAS alert inhibit is removed in action box 1565 and TCAS is allowed to attempt to resolve the conflict using it's cooperative altitude resolution. Control is then passed to action box 1545. If the CAS tracking function of TCAS is not active, or the warning has not extended beyond the preferred maximum time, control is passed to action box 1555. Action box 1555 sets the other ship warning alert to true for output to display logic 1170 for alerting an observer. Control is passed to action box 1545 to repeat the processing.

Pair Determination

Figure 16:
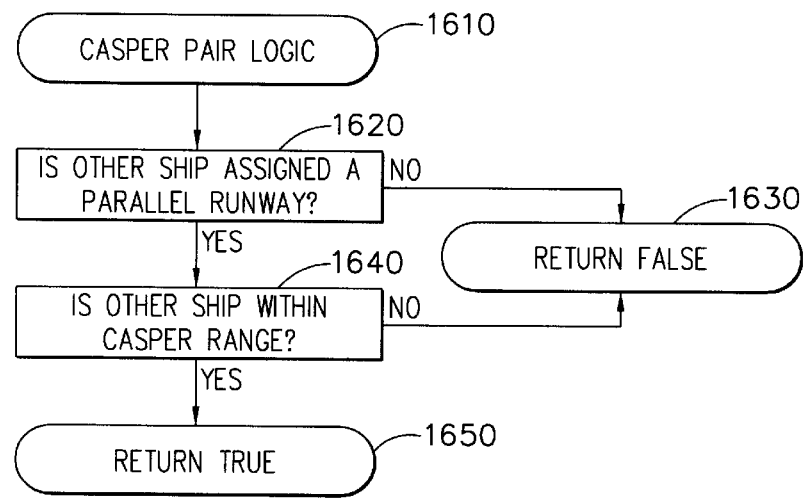
FIG. 16 is a flowchart of logic to determine pairing in accordance with one embodiment of the invention.

CASPER pair determination logic is described in FIG. 16. Action box 1610 signal initiation of the CASPER pair logic. Logical function 1620 determines whether the other ship is assigned a parallel runway with own ship. If not, action box 1630 sets the CASPER pair logic to false. If the other ship is assigned a parallel runway, logical function 1640 determines whether the other ship has a valid CASPER range and is Armed. Valid CASPER range determination is described below. If the CASPER range is valid and the other ship is Armed, action box 1650 sets the CASPER pair logic to true to designate the other ship as a CASPER pair.

Converging Aircraft Range Test $$\text{Tau}_{13}\text{ mod} = -(\text{range} - (d\text{mod}**2)/\text{range})/\text{adjusted}_{13}\text{ range}_{13}\text{ rate}$$

Where: if(range–rate<–10 ft/sec) adjusted$_{13}$ range$_{13}$ rate= range$_{13}$ rate;

if(−10 ft/sec<$range_{13}$ rate<10 ft/sec) $adjusted_{13}$ $range_{13}$ rate=−10.0;

if ($range_{13}$ rate>10 ft/sec) then perform diverging range test dmod=1.36 nm for turn on; dmod=1.5 nm for turn off Note: Negative range rate denotes converging aircraft.

1.36 nm analytically chosen for dmod to protect adjacent approach paths from all anticipated scenarios.

Diverging Aircraft Range Test

If ($range_{13}$ rate>10 ft/sec) then aircraft are diverging.

If (($range_{13}$ rate>10 ft/sec) and (range<dmod)) then $Test_{13}$ Passed dmod=1.36 nm for pairs on dmod=1.5 nm for pairs off

Display and Alerting

In order to simplify training and aid in pilot's understanding the proximity of local traffic, the CASPER System may use the Display and Alerting conventions associated with TCAS.

The Cockpit Display of Traffic Information (CDTI) utilize the TCAS conventions of Blue, Yellow, and Red colors for traffic icons to denote Advisory, Caution, and Warning states of the AILS Alert algorithm, respectively. Blue, or Proximate Traffic, icons are used to denote nearby traffic which is not a threat to own ship. Yellow icons denote an initial alert condition, the AILS algorithm is notifying the other aircraft that an unacceptable course deviation has been detected and that an Emergency Escape Maneuver is required on their part. Red icons denote a continuing hazard condition, and that an Emergency Escape Maneuver is required for own ship.

Auditory alerts accompany the alerting function (see Table 5).

TABLE 5

CASPER Suggested Auditory Alerts

| Alert Type | Auditory Alert |
| --- | --- |
| Marginal Path Blunder (Own ship) | Parallel Approach Path |
| Marginal Path Blunder (Adjacent Traffic) | Traffic, Parallel Approach |
| Extreme Path Blunder (Own ship) | Escape Maneuver NOW |
| Extreme Path Blunder (Adjacent Traffic) | Escape Maneuver NOW |

Figure 17:
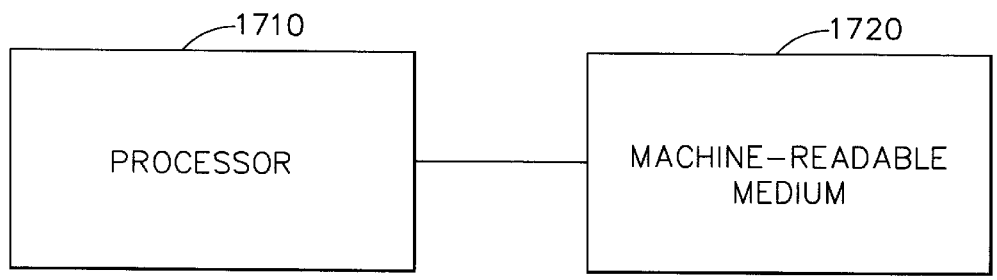
FIG. 17 is a block diagram of a system having a processor capable of carrying out an embodiment of the invention.

The various systems described make use of a variety of electronic equipment having processors utilizing instructions in machine-readable form to carry out the methods described herein. FIG. 17 depicts a block diagram of a processor 1710 coupled to a machine-readable medium 1720. Processor 1710 may include CAS processor 1100, a processor within ADS-B transmitter 294, or some combination of processors utilized to carry out the methods described herein. Furthermore, machine-readable medium 1720 may include fixed devices coupled to processor 1710, such as internal magnetic medium or programmable memory device, or removable devices coupled to processor 1710, such as removable magnetic medium or programming cartridge. Machine-readable medium 1720 contains instruction stored thereon capable of causing processor 1710 to carry out the methods described herein.

Systems, methods and protocol have been described for assuring separation of aircraft during parallel approaches. The systems and protocol function in cooperation with existing TCAS to facilitate approaches of multiple aircraft on closely-spaced parallel runways. Although specific embodiments have been illustrated and described herein, it will be appreciated by those of ordinary skill in the art that any arrangement which is calculated to achieve the same purpose may be substituted for the specific embodiments shown. Many adaptations of the invention will be apparent to those of ordinary skill in the art. As an example, values chosen for signal format and units, range, significant bits, and resolution of data are based upon good operational judgment, and changes may be made due to differences in judgment or prevailing regulations without departing from the scope herein. Accordingly, this application is intended to cover any adaptations or variations of the invention. It is manifestly intended that this invention be limited only by the following claims and equivalents thereof.

What is claimed is:

1. A method for collision avoidance alerting performed by an own aircraft, the method comprising:
   a. a step for receiving data for a first Airborne Information for Lateral Spacing (AILS) separation assurance algorithm performed by the own aircraft;
   b. a step for forming a track in accordance with received data for each of a plurality of aircraft, each track comprising first indicia of state and second indicia of whether current surveillance by the respective aircraft comprises a second AILS separation assurance algorithm performed by the respective aircraft;
   c. while the own aircraft is performing the first AILS separation assurance algorithm:
      (1) a step for providing alerting in accordance with the respective state and the first AILS separation assurance algorithm for each track of a first type, wherein criteria defining the first type includes:
         (a) the respective second indicia is true; and
         (b) an age of the received data for the respective track is less than a limit; and
      (2) a step for providing alerting in accordance with the respective state and a Traffic Alert and Collision Avoidance System (TCAS) alerting algorithm for each track not of the first type; and
   d. while the own aircraft is not performing the first AILS separation assurance algorithm, a step for providing alerting in accordance with the respective state and the TCAS alerting algorithm for each track of the plurality of aircraft.

2. The method of claim 1 further comprising discontinuing the performance of the first AILS separation assurance algorithm if at least one of a vertical figure of merit of the own aircraft and a horizontal figure of merit of the own aircraft lies outside a respective allowable range.

3. The method of claim 2 further comprising discontinuing the performance of the first AILS separation assurance algorithm if at least one of a vertical figure of merit in accordance with the received data and a horizontal figure of merit in accordance with the received data lies outside a respective allowable range.

4. The method of claim 3 further comprising discontinuing the performance of the first AILS separation assurance algorithm if a first distance differs from a second distance by more than a second limit, wherein the first distance is from the own aircraft to a respective other aircraft associated with a track of the first type, and the second distance is from the own aircraft to the respective other aircraft computed in accordance with the received data.

5. The method of claim 4 further comprising computing the second limit in accordance with a root of a sum of squares comprising at least one of a vertical figure of merit of the own aircraft, a horizontal figure of merit of the own aircraft, a vertical figure of merit of the respective other aircraft, a horizontal figure of merit of the respective other aircraft, and a constant.

6. The method of claim 5 further comprising broadcasting a third indicia for indicating whether the own aircraft is currently performing the first AILS separation assurance algorithm.

7. A system for collision avoidance alerting, the system installed in an own aircraft, the system comprising:
 a. means for receiving data for a first Airborne Information for Lateral Spacing (AILS) separation assurance algorithm performed by the own aircraft;
 b. means for forming a track in accordance with received data for each of a plurality of aircraft, each track comprising first indicia of state and second indicia of whether current surveillance by the respective aircraft comprises a second AILS separation assurance algorithm performed by the respective aircraft;
 c. means operative while the own aircraft is performing the first AILS separation assurance algorithm:
  (1) for providing alerting in accordance with the respective state and the first AILS separation assurance algorithm for each track of a first type, wherein criteria defining the first type includes:
   (a) the respective second indicia is true; and
   (b) an age of the received data for the respective track is less than a limit; and
  (2) for providing alerting in accordance with the respective state and a Traffic Alert and Collision Avoidance System (TCAS) alerting algorithm for each track not of the first type; and
 d. means operative while the own aircraft is not performing the first AILS separation assurance algorithm, for providing alerting in accordance with the respective state and the TCAS alerting algorithm for each track of the plurality of aircraft.

8. The system of claim 7 wherein performance of the first AILS separation assurance algorithm is discontinued if at least one of a vertical figure of merit of the own aircraft and a horizontal figure of merit of the own aircraft lies outside a respective allowable range.

9. The system of claim 8 wherein performance of the first AILS separation assurance algorithm is discontinued if at least one of a vertical figure of merit in accordance with the received data and a horizontal figure of merit in accordance with the received data lies outside a respective allowable range.

10. The system of claim 9 wherein performance of the first AILS separation assurance algorithm is discontinued if a first distance from the own aircraft to a respective other aircraft associated with a track of the first type differs from a second distance from the own aircraft to the respective other aircraft computed in accordance with the received data by more than a second limit.

11. The system of claim 10 wherein the second limit is computed in accordance with a root of a sum of squares comprising at least one of a vertical figure of merit of the own aircraft, a horizontal figure of merit of the own aircraft, a vertical figure of merit of the respective other aircraft, a horizontal figure of merit of the respective other aircraft, and a constant.

12. The system of claim 11 further comprising a third indicia and means for broadcasting the third indicia to indicate whether the own aircraft is currently performing the first AILS separation assurance algorithm.

* * * * *

UNITED STATES PATENT AND TRADEMARK OFFICE
CERTIFICATE OF CORRECTION

PATENT NO. : 6,690,296 B2
DATED : February 10, 2004
INVENTOR(S) : Corwin et al.

It is certified that error appears in the above-identified patent and that said Letters Patent is hereby corrected as shown below:

Title page,
Item [75], Inventors, "William R. Corwin" should read -- William H. Corwin --

Signed and Sealed this

Twenty-third Day of November, 2004

JON W. DUDAS
*Director of the United States Patent and Trademark Office*